United States Patent
Okumura et al.

(10) Patent No.: US 10,592,101 B2
(45) Date of Patent: Mar. 17, 2020

(54) DISPLAY DEVICE, DISPLAY CONTROLLING METHOD, AND COMPUTER PROGRAM

(71) Applicant: SONY CORPORATION, Tokyo (JP)

(72) Inventors: Mitsuo Okumura, Tokyo (JP); Hazime Matsuda, Kanagawa (JP); Shoji Imamura, Tokyo (JP); Katsuji Miyazawa, Kanagawa (JP); Motoki Higashide, Tokyo (JP); Kunihito Sawai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/419,588

(22) Filed: Jan. 30, 2017

(65) Prior Publication Data
US 2017/0139589 A1    May 18, 2017

Related U.S. Application Data

(63) Continuation of application No. 15/244,458, filed on Aug. 23, 2016, which is a continuation of application
(Continued)

(30) Foreign Application Priority Data

Jun. 26, 2013 (JP) .................................. 2013-133583

(51) Int. Cl.
*G06F 3/0488* (2013.01)
*G06F 3/041* (2006.01)
(Continued)

(52) U.S. Cl.
CPC .......... *G06F 3/04886* (2013.01); *G06F 3/041* (2013.01); *G06F 3/044* (2013.01);
(Continued)

(58) Field of Classification Search
CPC ................ G06F 3/04886; G06F 3/041; G06F 2203/04803; G06F 2203/04108;
(Continued)

(56) References Cited

U.S. PATENT DOCUMENTS 9,146,628 B2 *  9/2015  Wakizaka ............... G06F 3/041
2009/0265670 A1   10/2009  Kim
(Continued)

FOREIGN PATENT DOCUMENTS

JP        2012-257074       12/2012
JP        2014-16948 A      1/2014

*Primary Examiner* — Tony O Davis
(74) *Attorney, Agent, or Firm* — Xsensus, LLP

(57) ABSTRACT

A display device, method, computer-readable storage medium and user interface, each of which detects contact to or proximity of an object with respect to a generated image, and responsive to detection of contact to or proximity of the object to the generated image, disables any operational functions associated with a first portion of the generated image. Additionally, operation associated with a second portion of the generated image is allowed responsive to the detection of contact to or proximity of the object to the generated image, where the second portion of the generated image is different from the first portion of the generated image. An indication corresponding to the second portion of the generated image for which operation is enabled may be displayed on the generated image.

17 Claims, 29 Drawing Sheets

Related U.S. Application Data

No. 14/296,506, filed on Jun. 5, 2014, now Pat. No. 9,430,070.

(51) Int. Cl.

| | |
|---|---|
| *G06F 3/044* | (2006.01) |
| *G06F 3/0482* | (2013.01) |
| *H04N 5/232* | (2006.01) |
| *H04N 7/14* | (2006.01) |
| *H04N 1/00* | (2006.01) |
| *G06F 3/0484* | (2013.01) |
| *H04N 7/15* | (2006.01) |
| *H04N 101/00* | (2006.01) |
| *G06F 3/0485* | (2013.01) |

(52) U.S. Cl.
CPC .......... *G06F 3/0412* (2013.01); *G06F 3/0482* (2013.01); *G06F 3/04847* (2013.01); *H04N 1/00392* (2013.01); *H04N 5/23216* (2013.01); *H04N 7/147* (2013.01); *H04N 7/15* (2013.01); *G06F 3/04855* (2013.01); *G06F 2203/04108* (2013.01); *G06F 2203/04803* (2013.01); *H04N 2101/00* (2013.01); *H04N 2201/0084* (2013.01)

(58) Field of Classification Search
CPC ...... G06F 3/0412; G06F 3/044; G06F 3/0482; G06F 3/04847; G06F 3/04855; H04N 1/00392; H04N 2101/00; H04N 2201/0084; H04N 5/23216; H04N 7/147; H04N 7/15

USPC .................................................. 345/170–178

See application file for complete search history.

(56) References Cited

U.S. PATENT DOCUMENTS

| | | | |
|---|---|---|---|
| 2010/0090971 | A1 | 4/2010 | Choi |
| 2010/0275150 | A1 | 10/2010 | Chiba et al. |
| 2011/0083104 | A1* | 4/2011 | Minton ............... G06F 3/04886 715/815 |
| 2012/0071212 | A1 | 3/2012 | Endo |
| 2012/0206557 | A1* | 8/2012 | Ridges ............. H04N 21/41407 348/14.02 |
| 2012/0254808 | A1* | 10/2012 | Gildfind ............. G06F 3/04812 715/863 |
| 2012/0293440 | A1* | 11/2012 | Hotelling ............. G06F 3/0418 345/173 |
| 2012/0306928 | A1 | 12/2012 | Yoshinaka |
| 2013/0076941 | A1 | 3/2013 | Palanciuc |
| 2013/0285956 | A1* | 10/2013 | Kamii ................... G06F 3/0416 345/173 |
| 2014/0104217 | A1 | 4/2014 | Horiguchi |
| 2014/0282269 | A1* | 9/2014 | Strutt .................. G06F 3/04883 715/863 |
| 2015/0160776 | A1* | 6/2015 | Ajichi ................... G06F 3/0488 345/174 |

* cited by examiner

DISPLAY DEVICE, DISPLAY CONTROLLING METHOD, AND COMPUTER PROGRAM

CROSS REFERENCE TO RELATED APPLICATIONS

This application is a continuation of U.S. application Ser. No. 15/244,458, filed Aug. 23, 2016, which is a continuation of U.S. application Ser. No. 14/296,506, filed Jun. 5, 2014 (now U.S. Pat. No. 9,430,070), and claims the benefit of Japanese Priority Patent Application JP 2013-133583 filed Jun. 26, 2013, where the entire contents of each of the foregoing applications are incorporated herein by reference.

BACKGROUND

The present disclosure relates to a display device, a display controlling method, and a computer program.

In recent years, as represented by a high performance mobile phone called smartphone, a thin plate apparatus, called tablet terminal, having a touch panel and a display device, a game console, or the like, an apparatus provided with a display which has excellent function but is not so large in screen size is commonly used. Such an apparatus is configured to receive an operation by allowing the user to touch a screen with his/her finger.

The technique for using such an apparatus as a controller for remotely controlling another apparatus has been proposed, and it is actually being used (for example, JP 2012-257074A or other similar techniques). In order for an apparatus such as smartphone to remotely control another apparatus, it is common to display a setting screen for the remote control and to allow the user to operate the screen.

SUMMARY

As the case of a display device having a large size screen such as a display used in a personal computer (PC), if a setting screen is displayed on an apparatus having a relatively small screen such as a smartphone, area efficiency of a screen is greatly decreased. In other words, if the movable space of an operation portion is made large for the user to operate by being in contact with a screen using his/her finger or the like, the space for displaying other information is reduced accordingly.

Therefore, embodiments of the present disclosure provide a novel and improved display device, display controlling method, and computer program, capable of displaying without decreasing area efficiency.

According to an embodiment of the present disclosure, there is provided a display device including a detector configured to detect contact or proximity of a user to a screen, and a display controller configured to perform a display control based on the detection by the detector. The detector enables only detection in a predetermined range on the screen while detecting contact or proximity to an operation portion displayed on the screen. The display controller explicitly indicates a range corresponding to the predetermined range while the detector detects contact or proximity to the operation portion.

According to an embodiment of the present disclosure, there is provided a display controlling method including detecting contact or proximity of a user to a screen, and performing a display control based on the detection by the step of detecting. The step of detecting enables only detection in a predetermined range on the screen while detecting contact or proximity to an operation portion displayed on the screen. The step of performing the display control explicitly indicates a range corresponding to the predetermined range while detecting contact or proximity to the operation portion in the step of detecting.

According to an embodiment of the present disclosure, there is provided a computer program for causing a computer to execute: detecting contact or proximity of a user to a screen, and performing a display control based on the detection by the step of detecting. The step of detecting enables only detection in a predetermined range on the screen while detecting contact or proximity to an operation portion displayed on the screen. The step of performing the display control explicitly indicates a range corresponding to the predetermined range while detecting contact or proximity to the operation portion in the step of detecting.

According to one or more of embodiments of the present disclosure, it is possible to provide a novel and improved display device, display controlling method, and computer program, capable of displaying without decreasing area efficiency.

One or more embodiments of the present disclosure can also include a display device comprising: processing circuitry configured to detect contact to or proximity of an object with respect to a generated image, and responsive to detection of contact to or proximity of the object to the generated image, disabling any operational functions associated with a first portion of the generated image.

Additionally, one or more embodiments can include a display method comprising: detecting, using a processor, contact to or proximity of an object with respect to a generated image, and disabling, using the processor, any operational functions associated with a first portion of the generated image responsive to said detecting contact to or proximity of the object to the generated image.

In one or more embodiments of the present disclosure, a non-transitory computer-readable storage medium storing computer-readable instructions that, when executed by a computer, cause the computer to perform a method comprising: detecting contact to or proximity of an object with respect to a generated image, and disabling any operational functions associated with a first portion of the generated image responsive to said detecting contact to or proximity of the object to the generated image.

Embodiments of the present disclosure can also comprise a graphical user interface comprising: circuitry configured to generate an image; detect contact to or proximity of an object with respect to the generated image, and disable any operational functions associated with a first portion of the generated image responsive to detection of contact to or proximity of the object to the generated image.

DETAILED DESCRIPTION OF THE EMBODIMENT(S)

Figure 1:
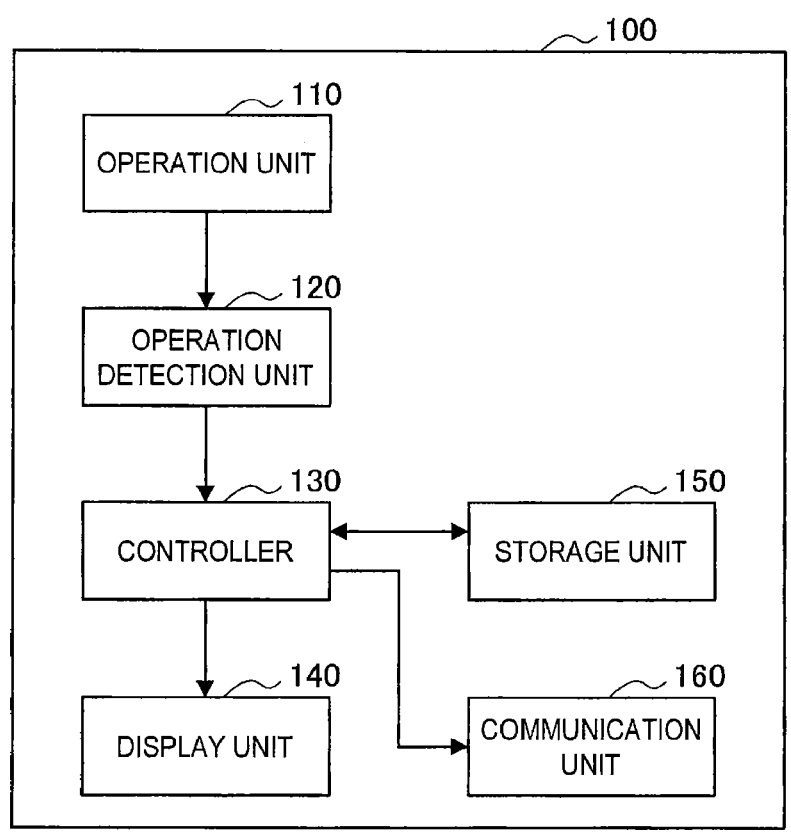
FIG. 1 is a diagram for explaining an exemplary functional configuration of a display device 100 according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
<1. Embodiment of the Present Disclosure>
[Exemplary Functional Configuration of Display Device]
[Exemplary Operation of Display Device]
[Exemplary Screen Display of Display Device]
<2. Exemplary Hardware Configuration>
<3. Summary>

1. Embodiment of the Present Disclosure

[Exemplary Functional Configuration of Display Device]
An exemplary functional configuration of a display device according to an embodiment of the present disclosure will be described with reference to the drawings. FIG. 1 is a diagram for explaining an exemplary functional configuration of a display device 100 according to an embodiment of the present disclosure. Referring to FIG. 1, an exemplary functional configuration of the display device 100 according to an embodiment of the present disclosure will now be described.

The display device 100 according to an embodiment of the present disclosure shown in FIG. 1 is configured to receive an operation by allowing the user to be in contact with a screen using his finger or the like, and an example of the display device 100 includes a smartphone, a tablet terminal, and a game console. As shown in FIG. 1, the display device 100 according to an embodiment of the present disclosure is configured to include an operation unit 110, an operation detection unit 120, a controller 130, a display unit 140, a storage unit 150, and a communication unit 160.

The operation unit 110 receives a user's operation on the display device 100. In the present embodiment, the operation unit 110 may include a touch panel, which is provided on a surface of the display unit 140 or is integrated with the display unit 140. Furthermore, the operation unit 110 may include hard keys or buttons, in addition to a touch panel which is provided on a surface of the display unit 140 or is integrated with the display unit 140. The user's operation to be performed on the operation unit 110 is detected by the operation detection unit 120.

In the following description, unless otherwise specified, the operation unit 110 is assumed to be configured to include a touch panel which is provided on a surface of the display unit 140 or is integrated with the display unit 140.

The operation detection unit 120 detects the contents of the user's operation performed on the operation unit 110. As an example, there may be the case where a user is in contact with the operation unit 110 using his/her finger or brings the finger in close proximity to the operation unit 110 at a distance less than a predetermined distance. In this case, the operation detection unit 120 detects coordinates of a position to which the user's finger is in contact or close proximity, the amount or rate of variation in a position to which the user's finger is in contact or close proximity, the number of points to which the user's finger is in contact or close proximity, or the like. The operation detection unit 120, when detecting the contents of the user's operation performed on the operation unit 110, transmits a result of the detection to the controller 130.

The controller 130 controls the display of information including a text, an image, or the like to be displayed on the display unit 140. When the controller 130 receives the result obtained by detecting the contents of the user's operation performed on the operation unit 110 from the operation detection unit 120, the controller 130 controls the display of information including a text, an image, or the like to be displayed on the display unit 140 based on the detection result.

An example of the display control on the display unit 140 by the controller 130 is described briefly here, but will be described in detail later. It is assumed that, in a case where a graphic (operation portion) for causing the user to specify a setting value is displayed on a given location of the display unit 140, the operation detection unit 120 detects that the user's finger is in contact with the location representing the graphic. The controller 130 causes the display unit 140 to indicate explicitly a range which is capable of being operated in a state where the user is in contact with the graphic depending on the contact with the location at which the graphic is displayed.

When the operation detection unit 120 detects that the user's finger is in contact with the graphic, and if the user's finger remains in contact with the graphic, then the operation detection unit 120 detects only whether the user's finger is in contact with the graphic, but does not detect whether the user's finger is in contact with a location other than the graphic.

In this way, the operation detection unit 120 and the controller 130 make it possible for the display device 100 to cause the display unit 140 to display information without decreasing area efficiency when the information is displayed by allowing the user to operate using the operation portion.

The display unit 140 displays information including a text, an image, or the like. The display of information including a text, an image, or the like on the display unit 140 is controlled by the controller 130. An example of the display unit 140 may include liquid crystal display, organic EL display, or the like. As described above, the display unit 140 may include a touch panel provided on a surface of the display unit 140 or integrated with the display unit 140.

The storage unit 150 stores various types of information. An example of information stored in the storage unit 150 includes a setting value for the display device 100, and a document, image and music data to be used in the display device 100. Information stored in the storage unit 150 can be read by the controller 130 and can be displayed on the display unit 140, as necessary. In addition, the storage unit 150 can store information by the control of the controller 130.

The communication unit 160 is an interface for performing communications with other devices. The communication unit 160 can perform the communication with other devices under the control of the controller 130. As an example, the communication unit 160 can transmit information stored in the storage unit 150 under the control of the controller 130.

In the present embodiment, the display device 100 is configured to be capable of displaying a setting screen used to perform the remote operation for a video conference system including a camera, a microphone, a loudspeaker or the like, and remotely controlling the video conference system by allowing the user to operate the setting screen. The communication unit 160 transmits settings specified by the setting screen to the video conference system. The video conference system may change the state of a camera, microphone, loudspeaker, or the like, based on the settings transmitted from the communication unit 160.

An exemplary functional configuration of the display device 100 according to an embodiment of the present disclosure has been described with reference to FIG. 1. Subsequently, an exemplary operation of the display device 100 according to an embodiment of the present disclosure will be described.

[Exemplary Operation of Display Device]

Figure 2:
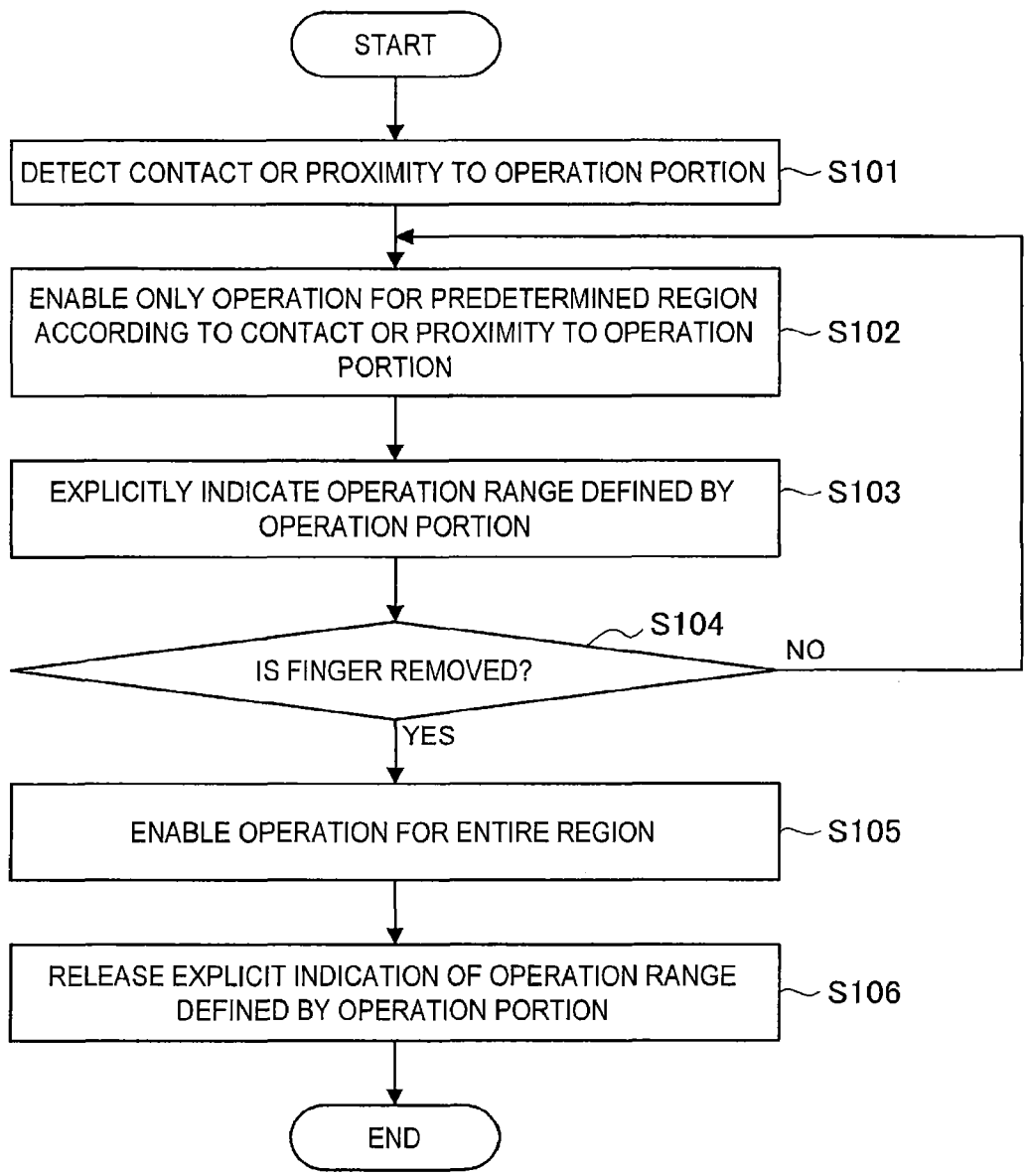
FIG. 2 is a diagram for explaining an exemplary operation of the display device 100 according to an embodiment of the present disclosure.

FIG. 2 is a flowchart illustrating an exemplary operation of the display device 100 according to an embodiment of the present disclosure. The flowchart shown in FIG. 2 is an operation example when the operation on a predetermined graphic (operation portion) displayed on the display device 100 is performed. An exemplary operation of the display device 100 according to an embodiment of the present disclosure is described below with reference to FIG. 2.

When the operation detection unit 120 detects contact or proximity of the user's finger or the like to a predetermined graphic (operation portion) displayed on the display unit 140 (step S101), the operation detection unit 120 enables only the operation for a predetermined region corresponding to the contact or proximity to the operation portion (step S102).

Furthermore, when the operation detection unit 120 detects contact or proximity of the user's finger or the like to the predetermined graphic (operation portion) displayed on the display unit 140 in step S101, the controller 130 performs a display control that explicitly indicates an operation range defined by the graphic (operation portion) on the display unit 140 (step S103).

When the processes in steps S102 and S103 are performed by the operation detection unit 120 and the controller 130, respectively, the operation detection unit 120 determines whether the user removes his finger or the like from the predetermined graphic (operation portion) displayed on the display unit 140 (step S104).

If it is determined that the user's finger or the like is not removed from the predetermined graphic (operation portion) displayed on the display unit 140 or the user's finger or the like is in close proximity to the predetermined graphic at a distance less than a predetermined distance, the processes in steps S102 and 103 are repeated.

On the other hand, if it is determined that the user's finger or the like is not in contact with the predetermined graphic (operation portion) displayed on the display unit 140 or the user's finger or the like is removed away from the predetermined graphic to a distance more than a predetermined distance, the operation detection unit 120 enables the operation for the entire region of the display unit 140 (step S105). In addition, the controller 130 releases the explicit indication of the operation range which is defined by the operation portion and displayed on the display unit 140 (step S106).

The display device 100 according to an embodiment of the present disclosure makes it possible for the display unit 140 to display information without decreasing area efficiency when the information is displayed by allowing the user to operate using the operation portion.

An operation example of the display device 100 according to an embodiment of the present disclosure has been described. Subsequently, the detailed screen display example of the display device 100 according to an embodiment of the present disclosure that is configured and operated as described above will be described.

[Exemplary Screen Display of Display Device]

Figure 3:
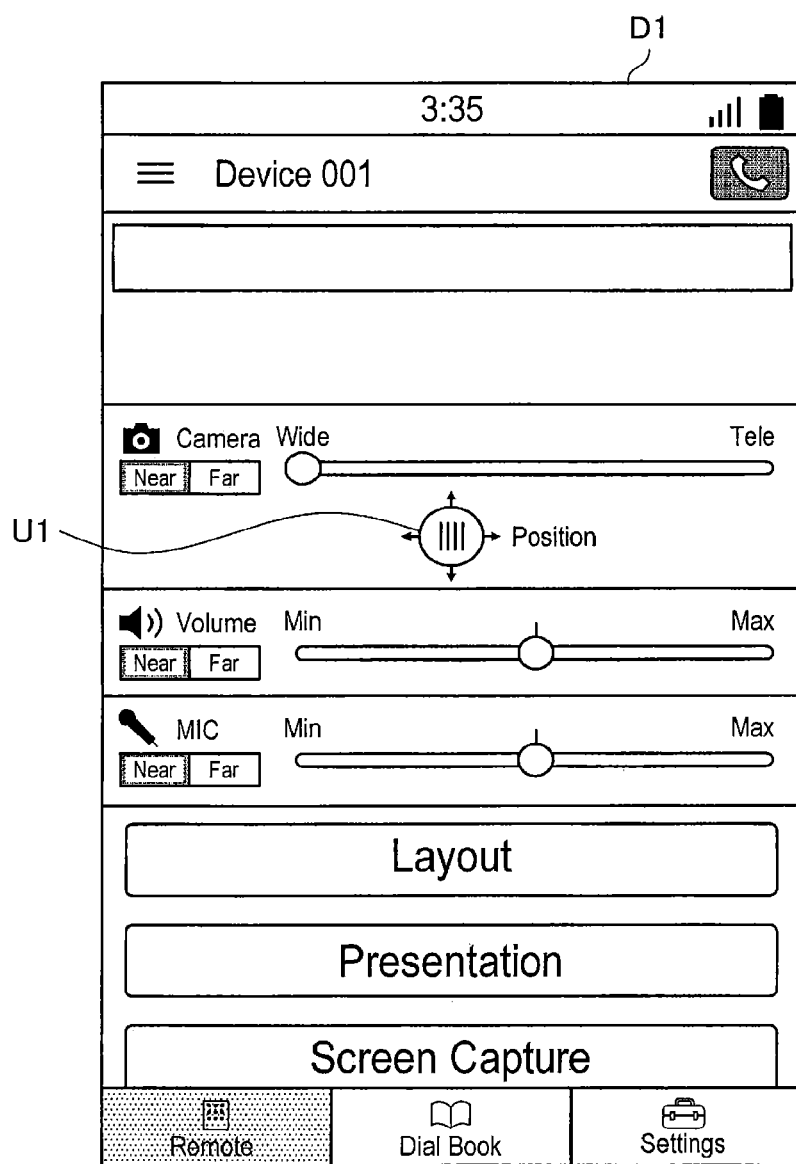
FIG. 3 is a diagram for explaining an exemplary screen display on a display unit 140 of the display device 100.

FIG. 3 is a diagram for explaining an exemplary screen display on the display unit 140 of the display device 100. A display screen D1 is an example of a screen displayed on the display unit 140. In the following, the description is given on the assumption that the display screen D1 is a setting screen for changing settings of a camera, a microphone, and a loudspeaker that are used in a video conference system.

FIG. 3 illustrates how a handle U1 that is an example of the operation portion is displayed on the display screen D1. The handle U1 is an operation portion used to change the orientation of a camera used in the video conference system and is assumed to be capable of receiving a two-dimensional operation.

When the finger or the like of the user of the display device 100 is brought into contact with a location at which the handle U1 is displayed, the display device 100 enables only operations for the handle U1 and explicitly indicates an operable range of the handle U1 on the display unit 140.

Figure 4:
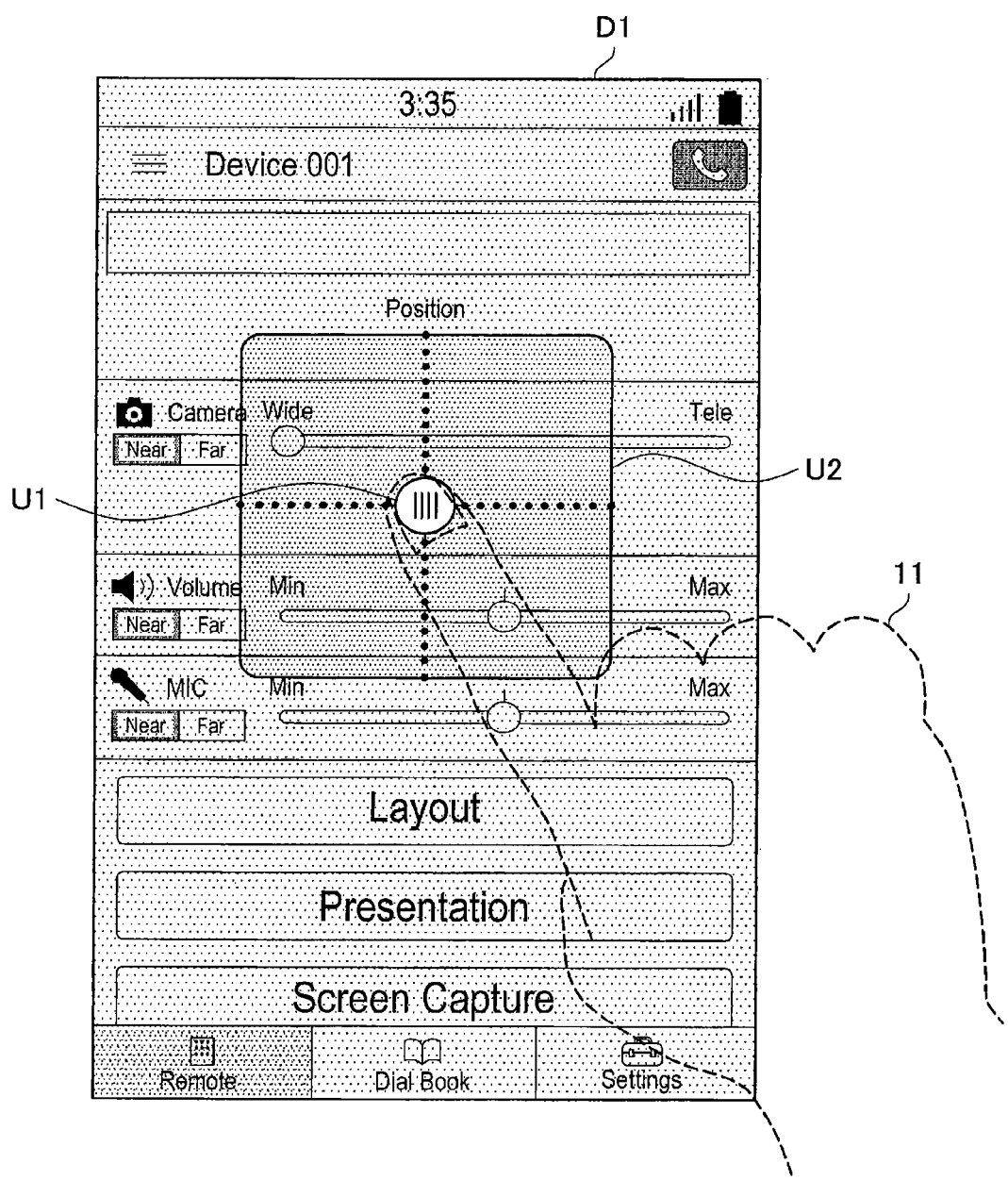
FIG. 4 is a diagram for explaining an exemplary screen display on the display unit 140 of the display device 100.

FIG. 4 is a diagram for explaining an exemplary screen display on the display unit 140 of the display device 100. FIG. 4 illustrates an example of the display screen D1 in a case where the user' finger is brought into contact with the handle U1, which is subsequent to the state shown in FIG. 3. FIG. 4 also illustrates a hand 11 of the user on the display device 100.

When the operation detection unit 120 detects that the user' finger is brought into contact with the handle U1, the display screen D1 as shown in FIG. 4 is displayed on the display unit 140 by the controller 130. The display screen D1 shown in FIG. 4 displays an operable range U2 of the handle U1 while the user's finger is being brought into contact with the handle U1.

Furthermore, FIG. 4 illustrates a state where regions other than the operable range U2 are displayed on the display unit 140 in such a way as to be darkened. Thus, the operable range U2 and the regions other than the operable range U2 are displayed on the display unit 140 in distinction from each other. When the user' finger is brought into contact with the regions other than the operable range U2 displayed on the display unit 140, the operation detection unit 120 is configured not to detect the contact with the regions other than the operable range U2 as the user's operation.

Figure 5:
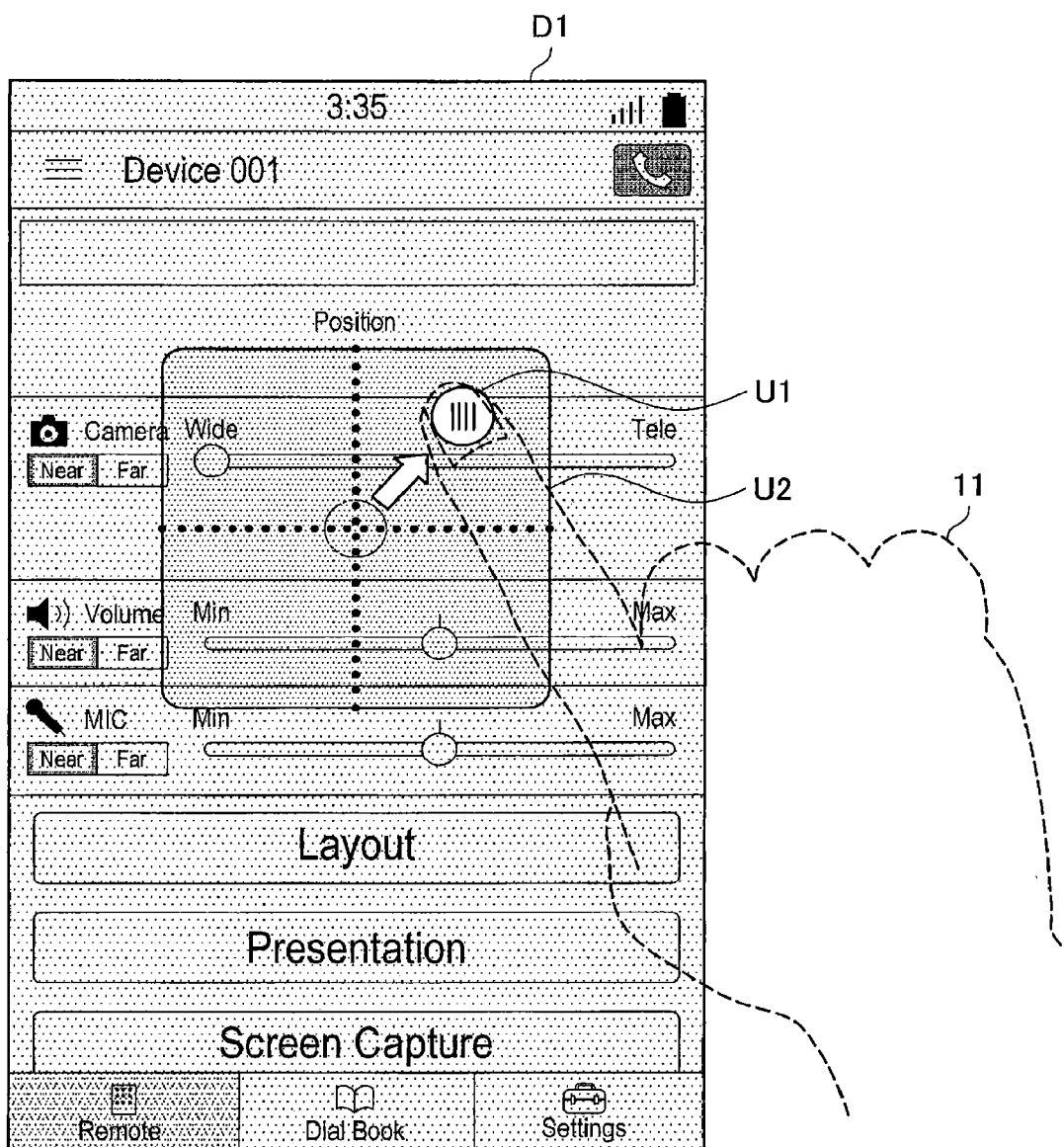
FIG. 5 is a diagram for explaining an exemplary screen display on the display unit 140 of the display device 100.

FIG. 5 is a diagram for explaining an exemplary screen display on the display unit 140 of the display device 100. FIG. 5 illustrates an example of the display screen D1 in a case where the user moves the handle U1 in the upper right direction while the user's finger is being brought into contact with the handle U1, which is subsequent to the state shown in FIG. 4. The display device 100 can change the orientation of a camera used in the video conference system by allowing the user to operate the handle U1.

Figure 6:
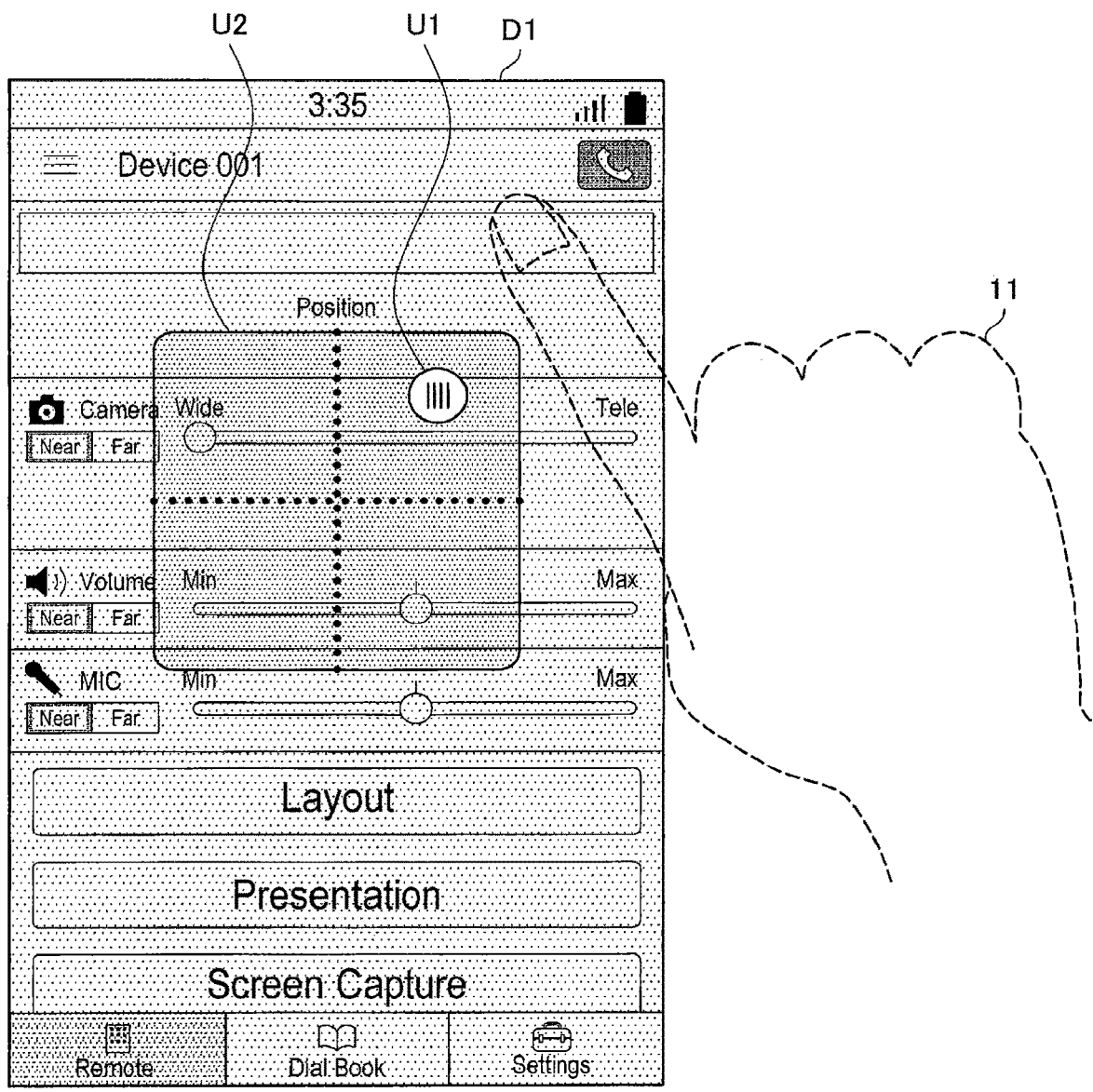
FIG. 6 is a diagram for explaining an exemplary screen display on the display unit 140 of the display device 100.

FIG. 6 is a diagram for explaining an exemplary screen display on the display unit 140 of the display device 100. FIG. 6 illustrates an example of the display screen D1 in a case where the user removes the finger from the handle U1, which is subsequent to the state shown in FIG. 5. In this way, when the user removes the finger from the handle U1, the controller 130 causes the handle U1 to be displayed on the display unit 140 in such a way as to be moved back to its original position. When the handle U1 is moved back to its original position, the controller 130 may immediately move the handle U1 back to its original position or may move the handle U1 back to its original position while displaying its continuous motion.

Figure 7:
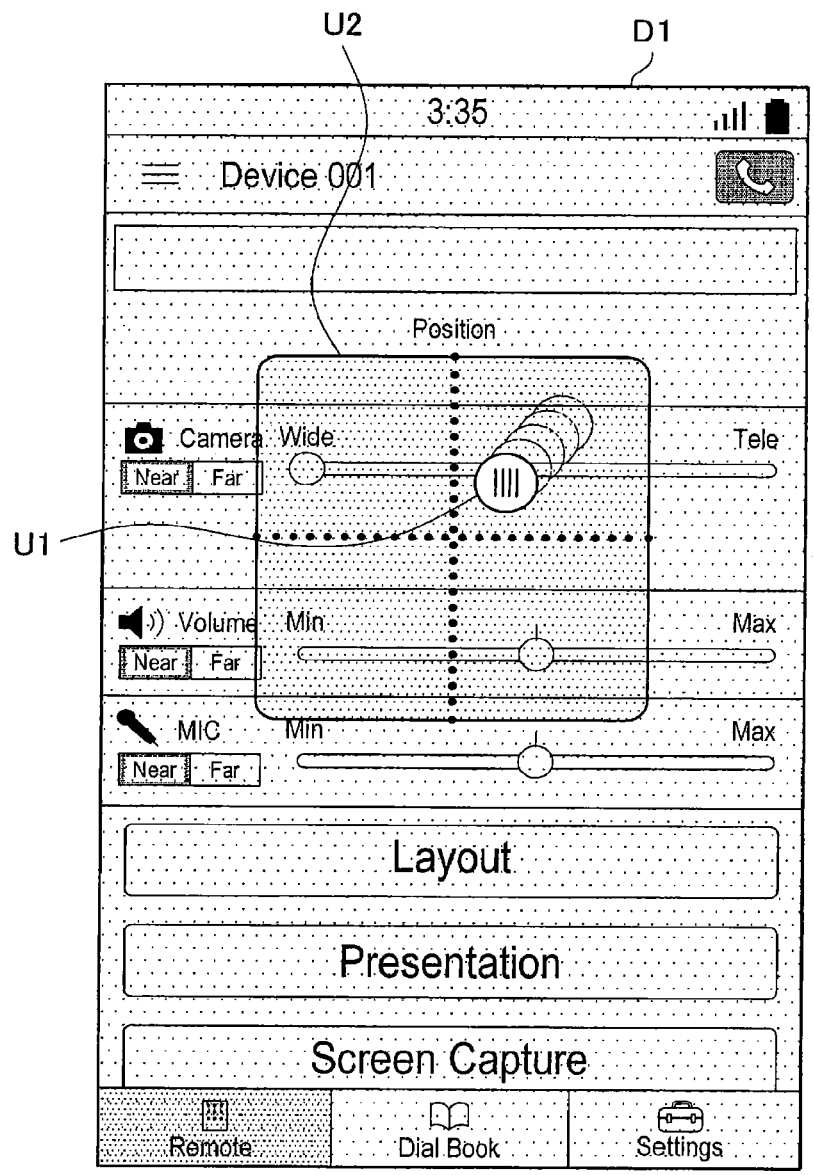
FIG. 7 is a diagram for explaining an exemplary screen display on the display unit 140 of the display device 100.
Figure 8:
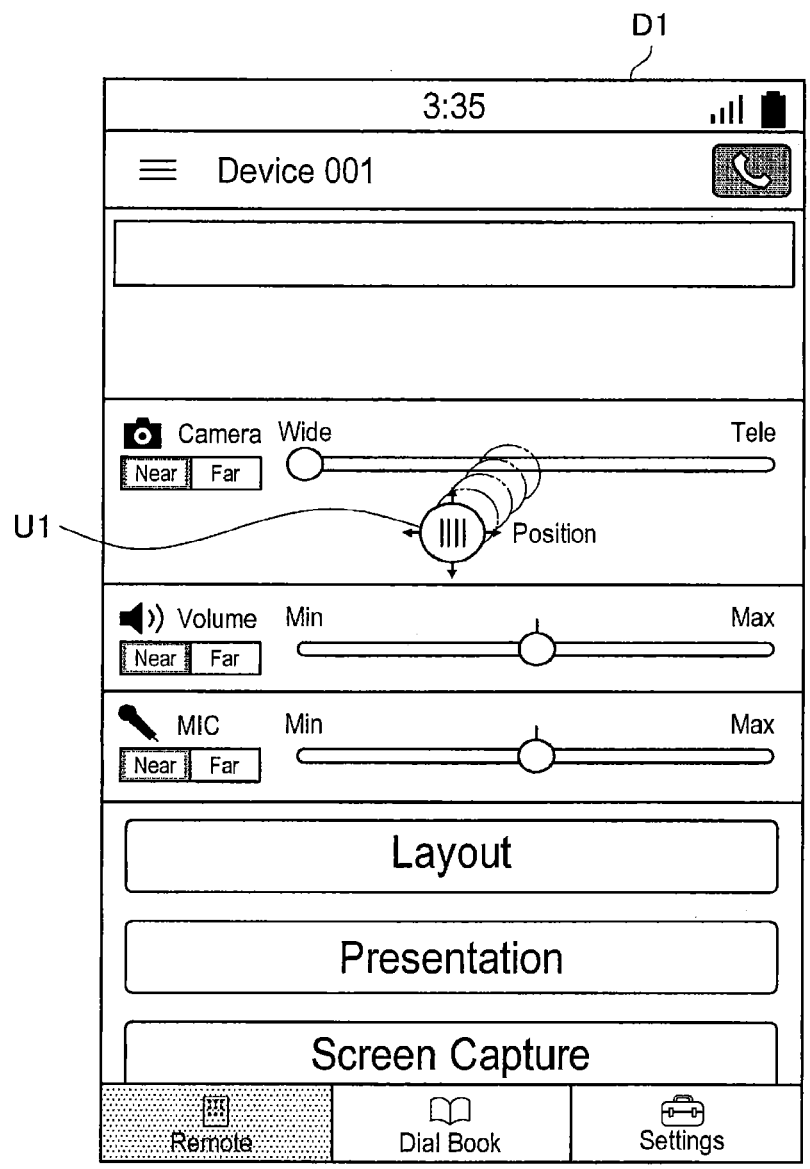
FIG. 8 is a diagram for explaining an exemplary screen display on the display unit 140 of the display device 100.

FIGS. 7 and 8 are diagrams for explaining an exemplary screen display on the display unit 140 of the display device 100. FIGS. 7 and 8 illustrate an example of the display screen D1 in which the handle U1 is displayed on the display unit 140 in such a way as to be moved back to its original position, which is subsequent to the state where the user removes the finger from the handle U1 as shown in FIG. 6.

When the user removes the finger from the handle U1, the controller 130 causes the handle U1 to be displayed on the display unit 140 in such a way as to be moved back toward its original position, as shown in FIGS. 7 and 8. When the handle U1 is displayed on the display unit 140 in such a way as to be moved back toward its original position, the controller 130 changes the display of the operable range U2 of the handle U1 and the display of the region other than the operable range U2 of the handle 111, as shown in FIGS. 7 and 8. FIG. 7 illustrates how the color of the operable range U2 of the handle U1 and the region other than the operable range U2 of the handle U1 is becoming thinner.

As shown in FIG. 8, the controller 130, when it moves the display position of the handle U1 back to its original position, completely erases the display of the operable range U2 of the handle U1. In this way, the controller 130 completely erases the display of the operable range U2 of the handle U1 at the time of moving the display position of the handle U1 back to its original position. Accordingly, the display device 100 makes it possible for the user to recognize that the operations can be received for all regions, including the handle U1, which are displayed on the display screen D1.

The display device 100 can control the orientation of a camera used in the video conference system by allowing the user to be brought into contact with the handle U1 displayed on the display unit 140 using the finger and to operate the handle U1. In this case, an image captured by the camera may be displayed in the operable range U2 of the handle U1.

An example of the display screen in a state where the user is brought into contact with the handle U1 capable of the two-dimensional operation using the finger or the like has been described. However, the display device 100 can also perform a similar display control or operation detection control to the case of the operation portion for allowing a one-dimensional operation.

Figure 9:
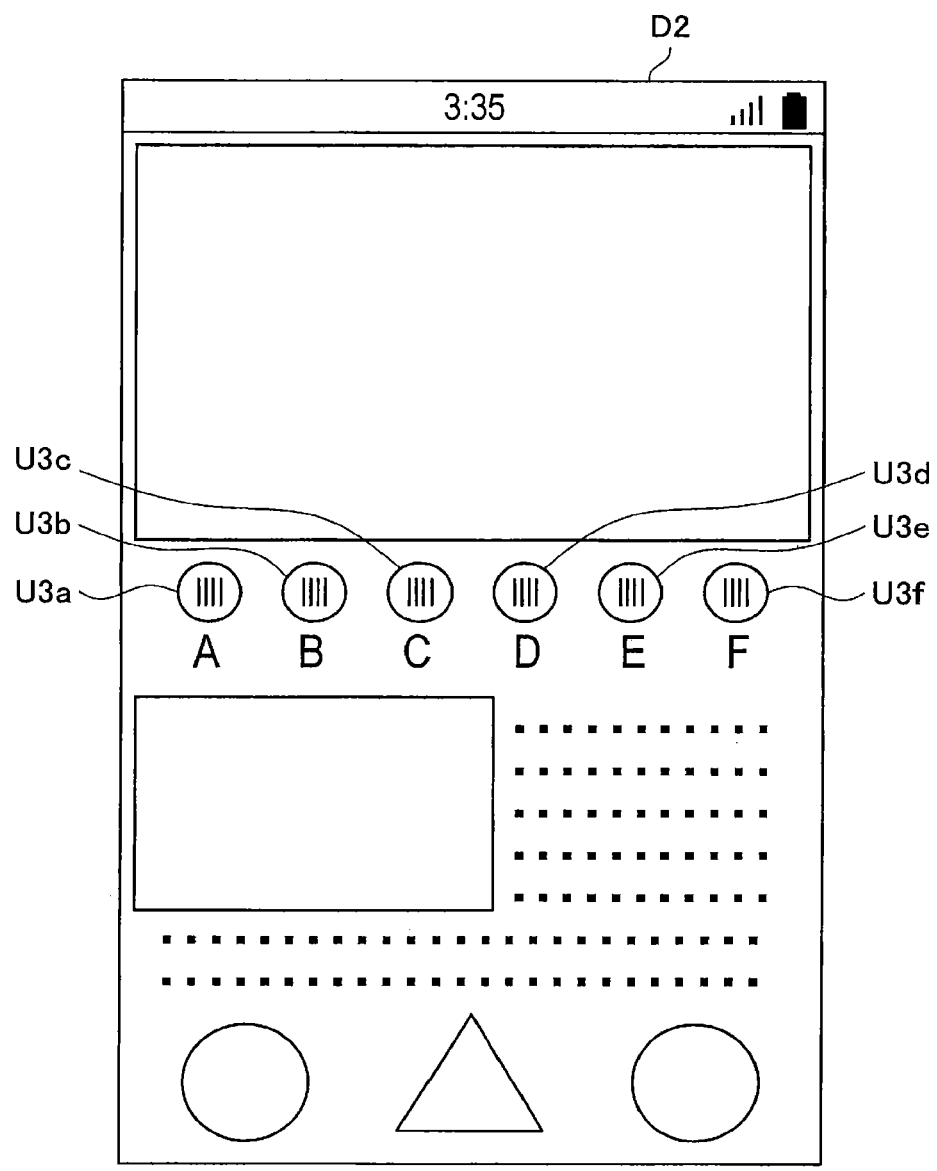
FIG. 9 is a diagram for explaining an exemplary screen display on the display unit 140 of the display device 100.

FIG. 9 is a diagram for explaining an exemplary screen display on the display unit 140 of the display device 100. A display screen D2 is an example of a screen to be displayed on the display unit 140. In this example, the description is given on the assumption that the display screen D2 is a setting screen for changing internal settings of the display device 100. In addition, FIG. 9 illustrates how buttons U3a to U3f, which are an example of the operation portion, are displayed on the display screen D2.

Figure 10:
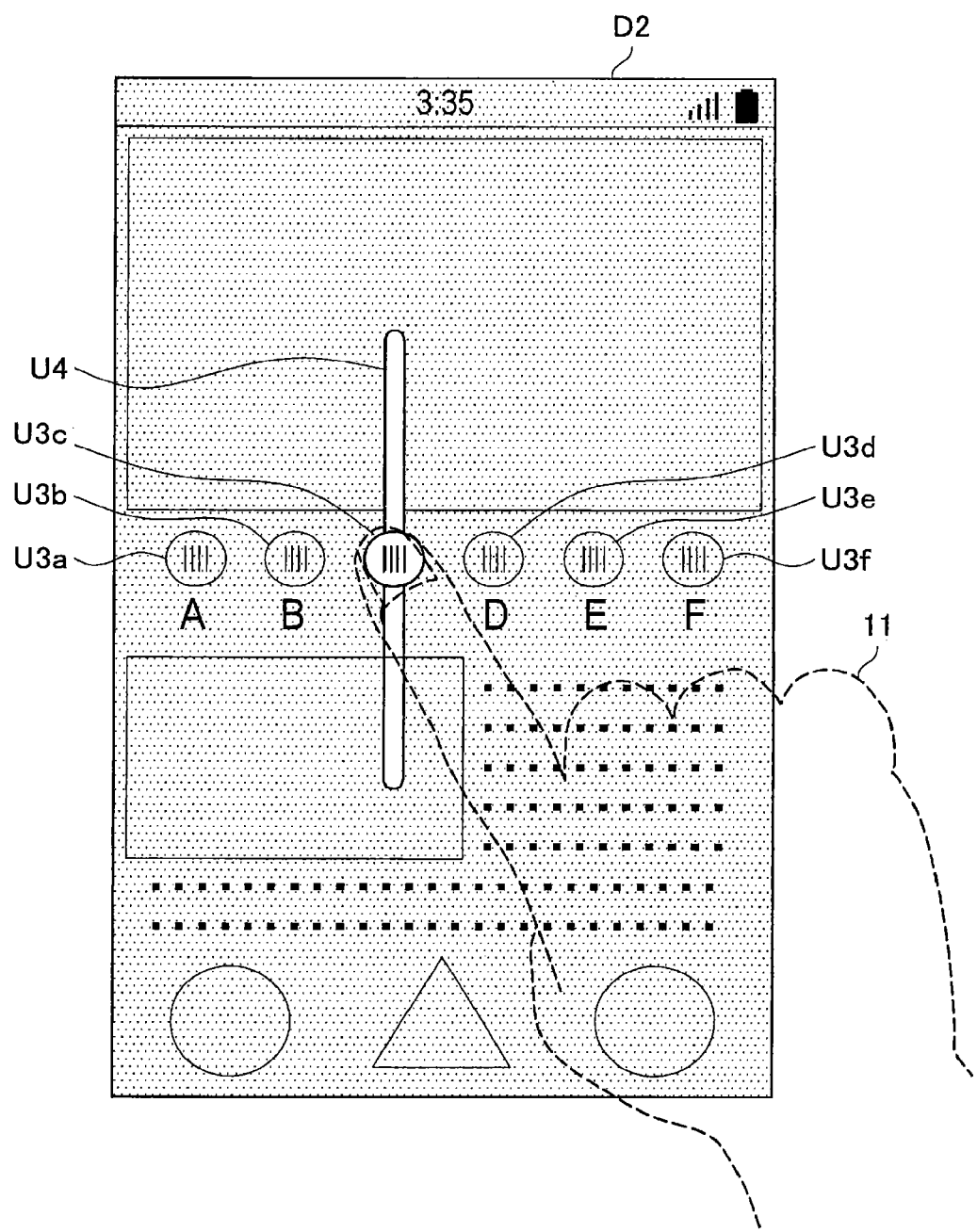
FIG. 10 is a diagram for explaining an exemplary screen display on the display unit 140 of the display device 100.

FIG. 10 is a diagram for explaining an exemplary screen display on the display unit 140 of the display device 100. FIG. 10 illustrates an example of the display screen D2 in a case where the user's finger is brought into contact with the button U3c, which is subsequent to the state shown in FIG. 9. FIG. 10 also illustrates a hand 11 of the user on the display device 100.

When the operation detection unit 120 detects that the user's finger is brought into contact with the button U3c, the display screen D2 as shown in FIG. 10 is displayed on the display unit 140 by the controller 130. The display screen D2 shown in FIG. 10 displays an operable range U4 of the button U3c while the user's finger is being brought into contact with the button U3c.

Moreover, FIG. 10 illustrates how regions other than the operable range U4 are displayed on the display unit 140 in such a way as to be darkened, as in the case of the display screen D1 shown in FIG. 4. When the finger or the like of the user is brought into contact with regions other than the operable range U4, the operation detection unit 120 is configured not to detect the contact as the user's operation.

Figure 11:
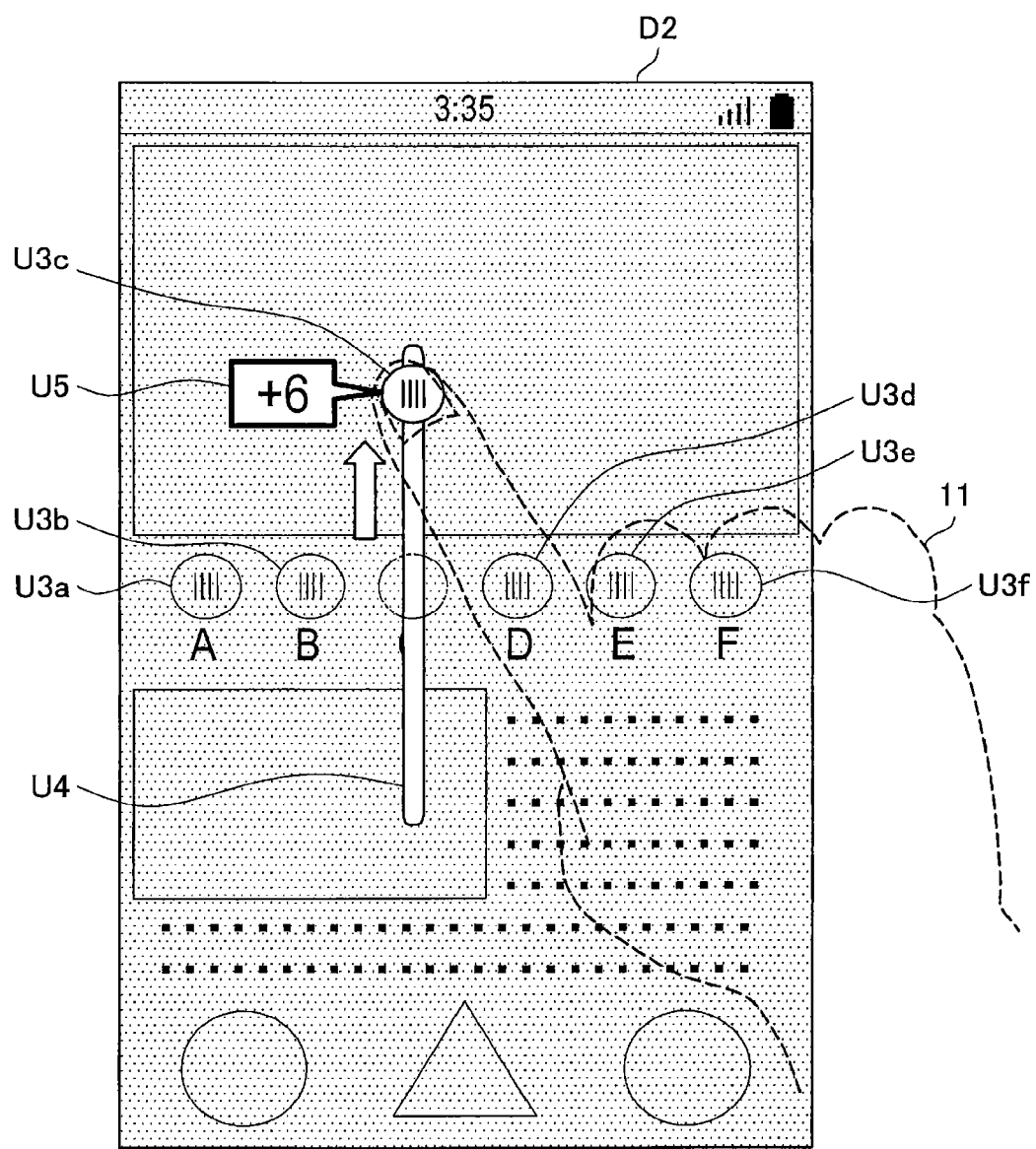
FIG. 11 is a diagram for explaining an exemplary screen display on the display unit 140 of the display device 100.

FIG. 11 is a diagram for explaining an exemplary screen display on the display unit 140 of the display device 100. FIG. 11 illustrates an example of the display screen D2 in a case where the user moves the button U3c in the upward direction while the user's finger is being in contact with the button U3c, which is subsequent to the state shown in FIG. 10. When the user operates the button U3c, the display device 100 can change the internal settings accordingly. In addition, the display device 100 can cause the storage unit 150 to store the internal settings of the display device 100 changed by allowing the user to operate the button U3c.

When the user moves the button U3c while the user's finger is being in contact with the button U3c, the controller 130 may cause the display unit 140 to display information indicating variation in setting values in accordance with the movement of the button as shown in FIG. 11. FIG. 11 illustrates an example in which a balloon U5 representing the variation in setting values caused by the movement of the button U3c is displayed on the display screen D2 under the control of the controller 130. A numeric character marked in the balloon U5 by the control of the controller 130 can be changed depending on the operation of the button U3c by the user.

FIG. 11 illustrates an example in which the balloon U5 is displayed on the display unit 140 in a case where the user moves the button U3c while the user's finger is being in contact with the button U3c. Similarly, when the user operates other buttons, a balloon corresponding to each button may be displayed on the display unit 140.

Figure 12:
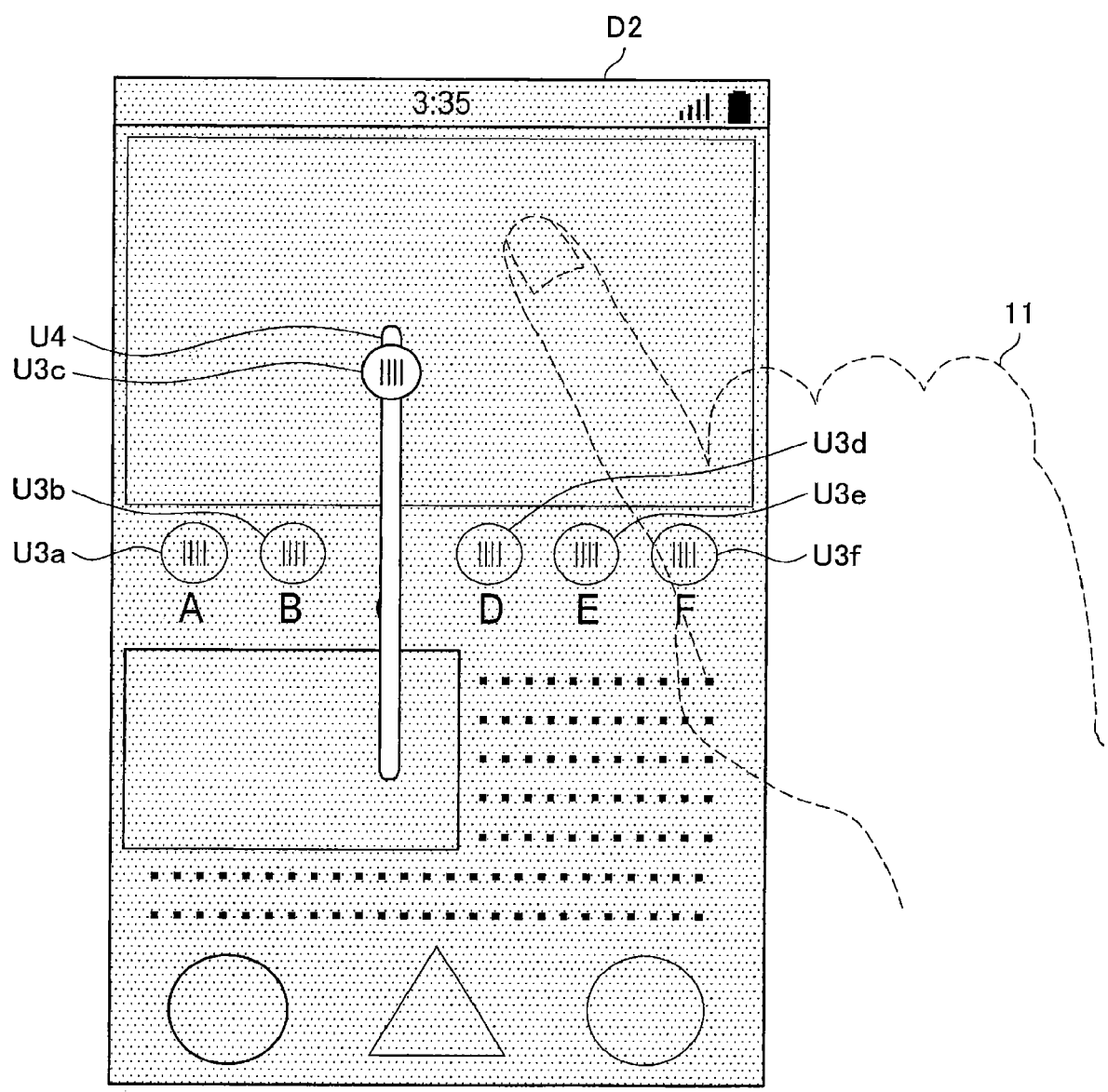
FIG. 12 is a diagram for explaining an exemplary screen display on the display unit 140 of the display device 100.

FIG. 12 is a diagram for explaining an exemplary screen display on the display unit 140 of the display device 100. FIG. 12 illustrates an example of the display screen D2 in a case where the user removes the finger from the button U3c, which is subsequent to the state shown in FIG. 11. In this way, when the user removes the finger from the button U3c, the controller 130 causes the button U3c to be displayed on the display unit 140 in such a way as to be moved back to its original position. When the button U3c is moved back to its original position, the controller 130 may immediately move the button U3c back to its original position or may move it back to its original position while displaying its continuous motion.

Figure 13:
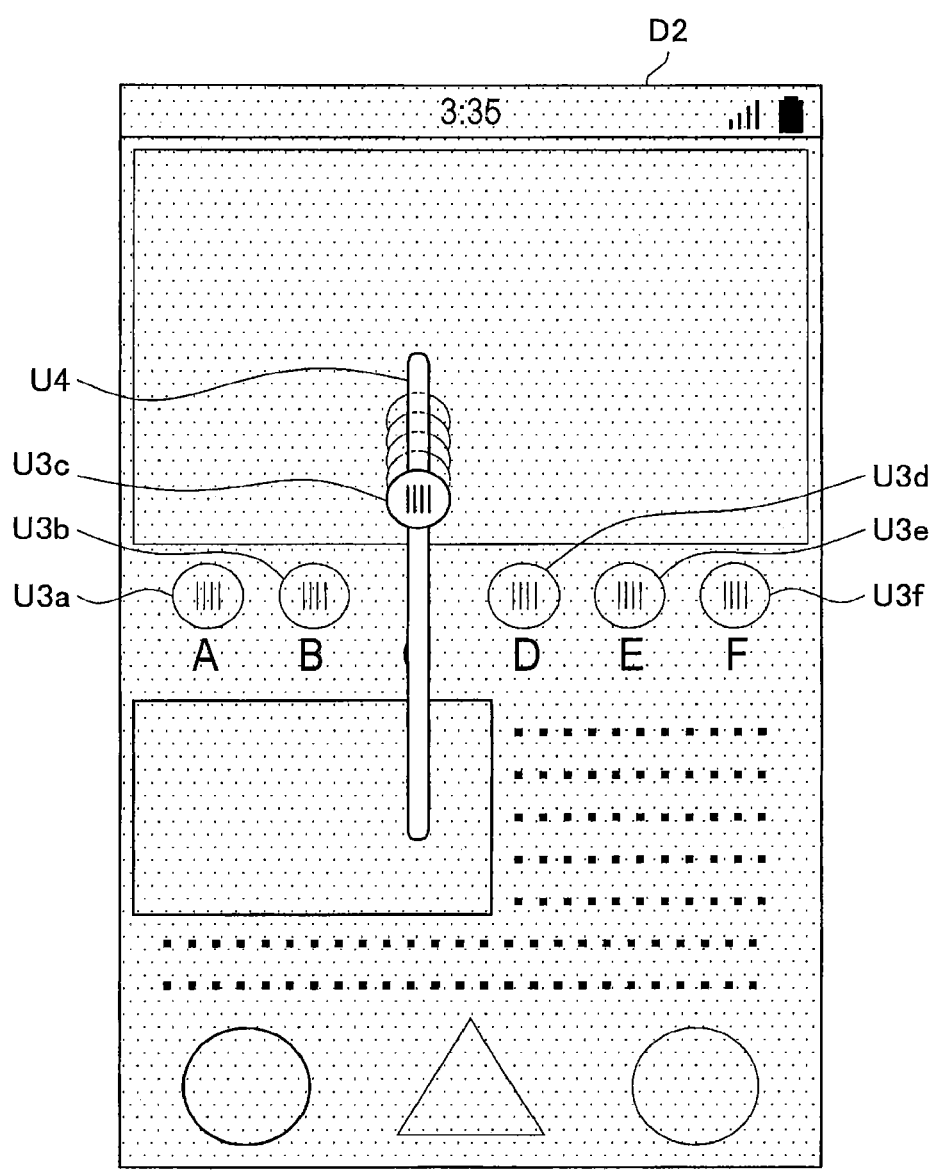
FIG. 13 is a diagram for explaining an exemplary screen display on the display unit 140 of the display device 100.
Figure 14:
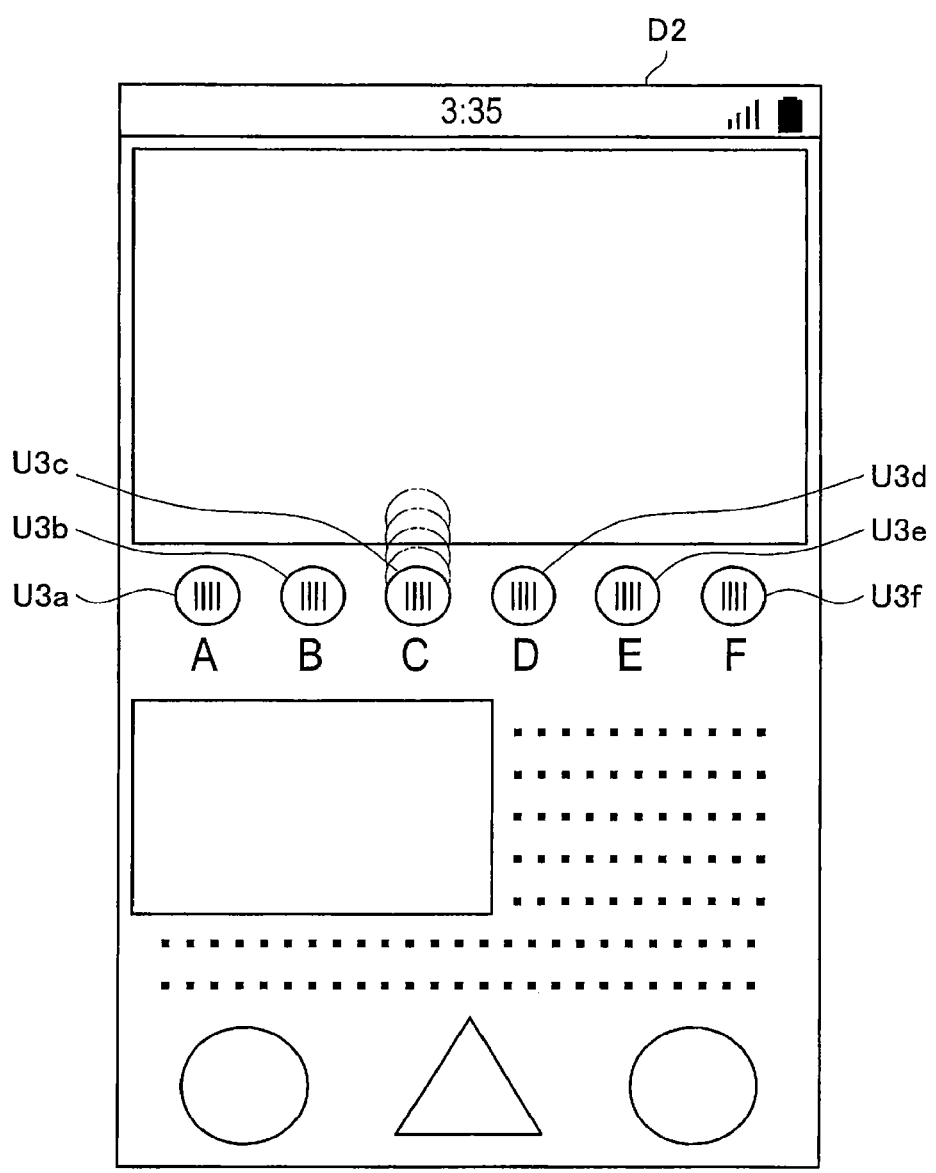
FIG. 14 is a diagram for explaining an exemplary screen display on the display unit 140 of the display device 100.

FIGS. 13 and 14 are diagrams for explaining an exemplary screen display on the display unit 140 of the display device 100. FIGS. 13 and 14 illustrate an example of the display screen D2 in which the button U3c is displayed on the display unit 140 in such a way as to be moved back to its original position, which is subsequent to the state where the user removes the finger from the button U3c as shown in FIG. 12.

When the user removes the finger from the button U3c, the controller 130 causes the button U3c to be displayed on the display unit 140 in such a way as to be moved back toward its original position, as shown in FIGS. 13 and 14. When the button U3c is displayed on the display unit 140 in such a way as to be moved toward its original position, the controller 130 changes the display of the operable range U4 of the button U3c and the display of the region other than the operable range U4 of the button U3c, as shown in FIGS. 13 and 14. FIG. 13 illustrates the operable range U4 of the button U3c, and illustrates how the color of regions other than the operable range U4 of the button U3c is becoming thinner.

As shown in FIG. 14, the controller 130, when it moves the display position of the button U3c back to its original position, completely erases the display of the operable range U4 of the button U3c. In this way, the controller 130 completely erases the display of the operable range U4 of the button U3c at the time of moving the display position of the button U3c back to its original position. Accordingly, the display device 100 makes it possible for the user to recognize that the operations can be received for all regions, including the button U3c, which are displayed on the display screen D2.

Figure 15:
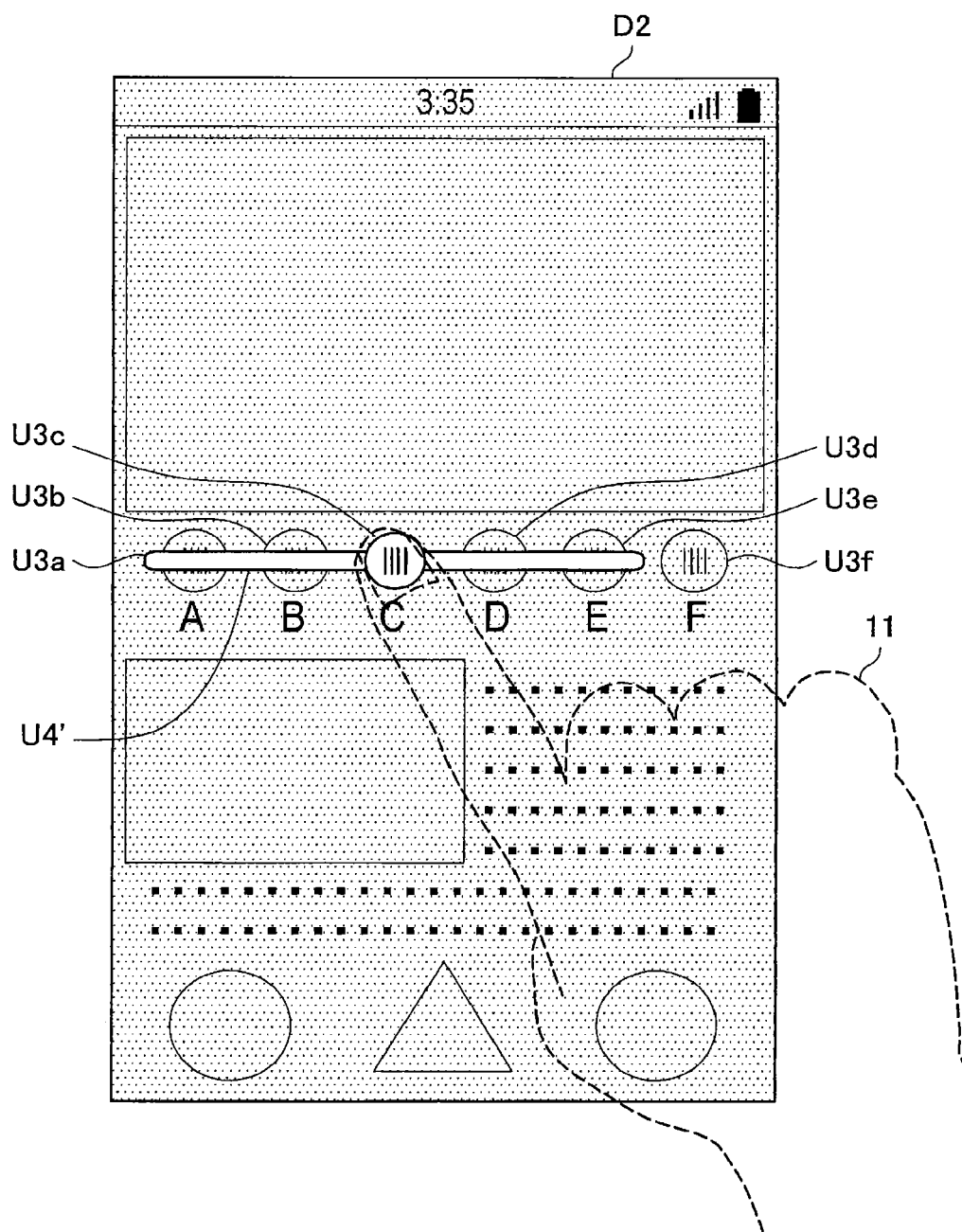
FIG. 15 is a diagram for explaining an exemplary screen display on the display unit 140 of the display device 100.

In the examples shown in FIGS. 10 to 14, the operable range U4 of the button U3c is displayed to be movable in the up-down direction, but the present disclosure is not limited to these examples. FIG. 15 is a diagram for explaining an exemplary screen display on the display unit 140 of the display device 100. FIG. 15 illustrates an operable range U4' of the button U3c that is displayed on the display screen D2 while the user's finger is being in contact with the button U3c. The operable range U4' of the button U3c is displayed to be movable in the lateral direction, which is different from the operable range U4 of the button U3c shown in FIG. 10 or other drawings.

The display device 100 causes the operable range U4' to be displayed in the lateral direction of the screen as shown in FIG. 15. When the user's finger is brought into contact with regions other than the operable range U4', the operation detection unit 120 may be configured not to detect the contact as the user's operation.

In the examples described above, if the user removes the finger or the like from the operation portion (for example, the handle U1 or button U3c), the operation portion (the handle U1 or button U3c) is to be moved back to its original position. However, in a case where an item to be set by the user using an operation portion is specified as an absolute value rather than a relative value, if the user removes the finger or the like from the operation portion to be moved back to its original position and then the finger or the like of the user is again brought into contact with the operation portion, the display device 100 may change the position where an operable range of the operation portion is displayed.

Figure 16:
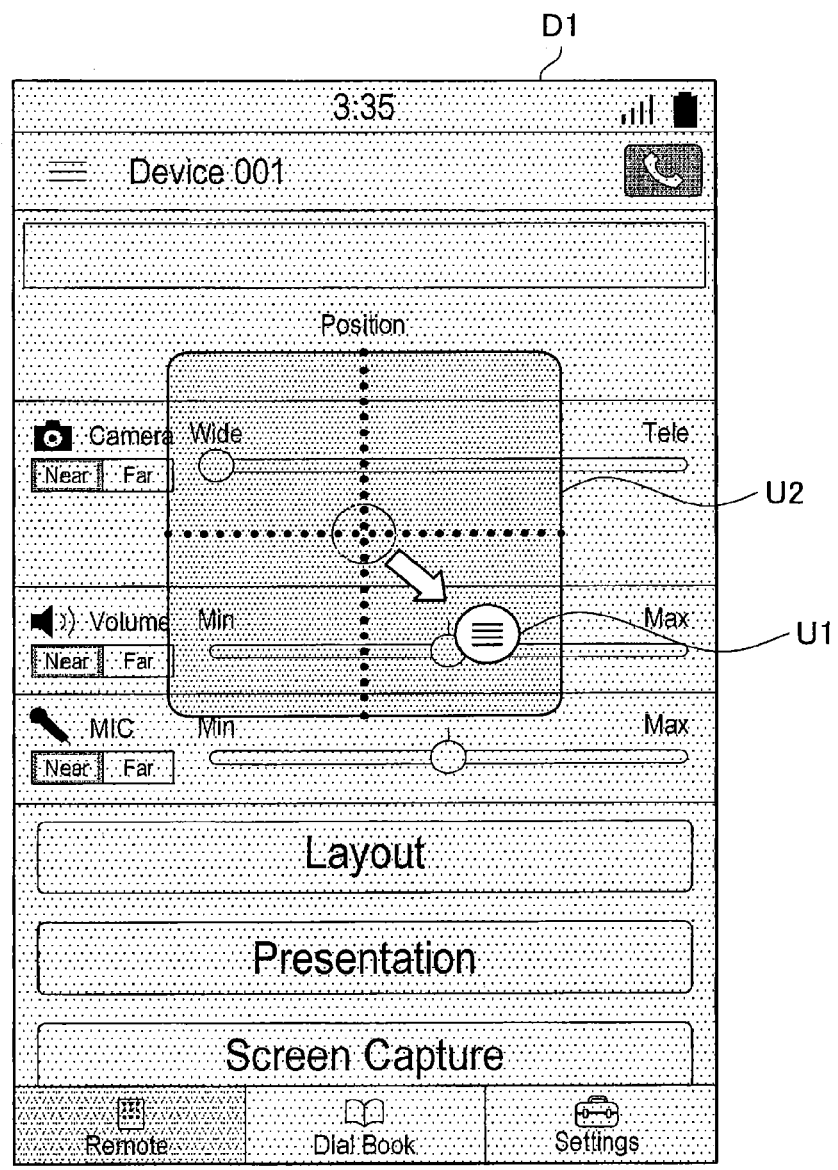
FIG. 16 is a diagram for explaining an exemplary screen display on the display unit 140 of the display device 100.

FIG. 16 is a diagram for explaining an exemplary screen display on the display unit 140 of the display device 100. In FIG. 16, the handle U1 and the operable range U2 of the handle U1 are displayed on the display screen D1, and a state where the user moves the handle U1 to the lower right side of the operable range U2 is displayed on the display screen D1. In this example, an item to be set by the user using the handle U1 is assumed to be specified as an absolute value.

If the user removes the finger from the handle U1 in the state shown in FIG. 16, as described above, the display device 100 moves the handle U1 to its original position. If the handle U1 is moved back to its original position and then the user's finger is again brought into contact with the handle U1, the display device 100 causes the operable range U2 to be displayed on the display screen D1 based on the value set by the handle U1 in the state shown in FIG. 16.

Figure 17:
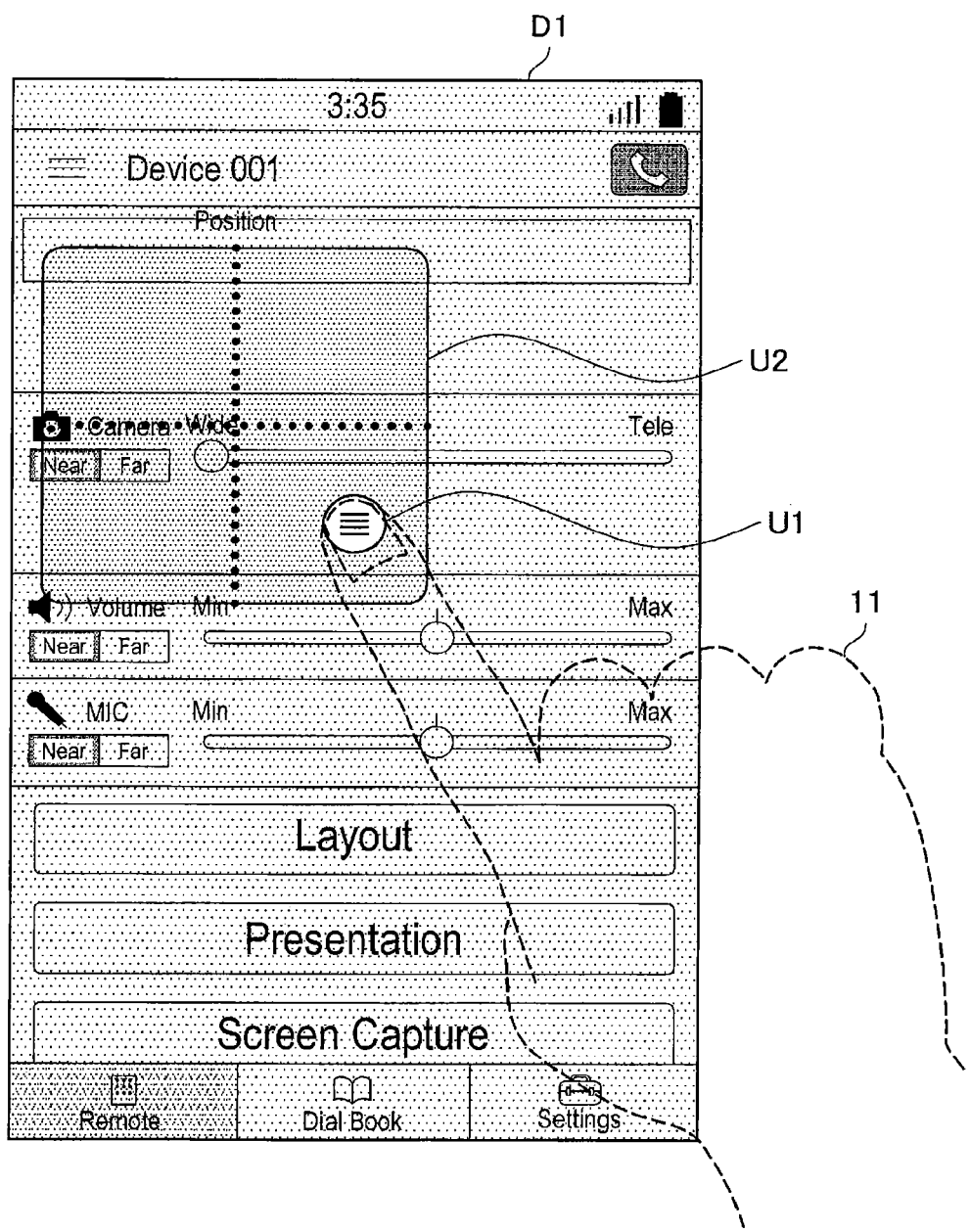
FIG. 17 is a diagram for explaining an exemplary screen display on the display unit 140 of the display device 100.

FIG. 17 is a diagram for explaining an exemplary screen display on the display unit 140 of the display device 100. FIG. 17 illustrates an example of the display screen D1 in a case where the user's finger is brought into contact with the handle U1, when a value is set by the handle U1 in the state shown in FIG. 16 and then the display screen is returned to the state shown in FIG. 3. FIG. 17 also illustrates a hand 11 of the user on the display device 100.

When the user's finger is brought into contact with the handle U1, the display device 100 causes the operable range U2 to be displayed on the display screen D1 as shown in FIG. 17 based on the value set by the handle U1 in the state shown in FIG. 16. In other words, the display device 100 can cause the operable range U2 to be displayed on the display screen D1 while maintaining a positional relationship between the handle U1 and the operable range U2 as shown in FIG. 16, rather than causing the operable range U2 to be displayed on the display screen D1 with the handle U1 as a center.

In this way, the operable range U2 is displayed based on the value set by the handle U1, and thus the display device 100 allows a current setting value to be displayed for the user to easily recognize the current setting value.

Even when the operable range defined by the operation portion is one-dimensional, the display device 100 can allow the operable range to be displayed in accordance with the setting value.

Figure 18:
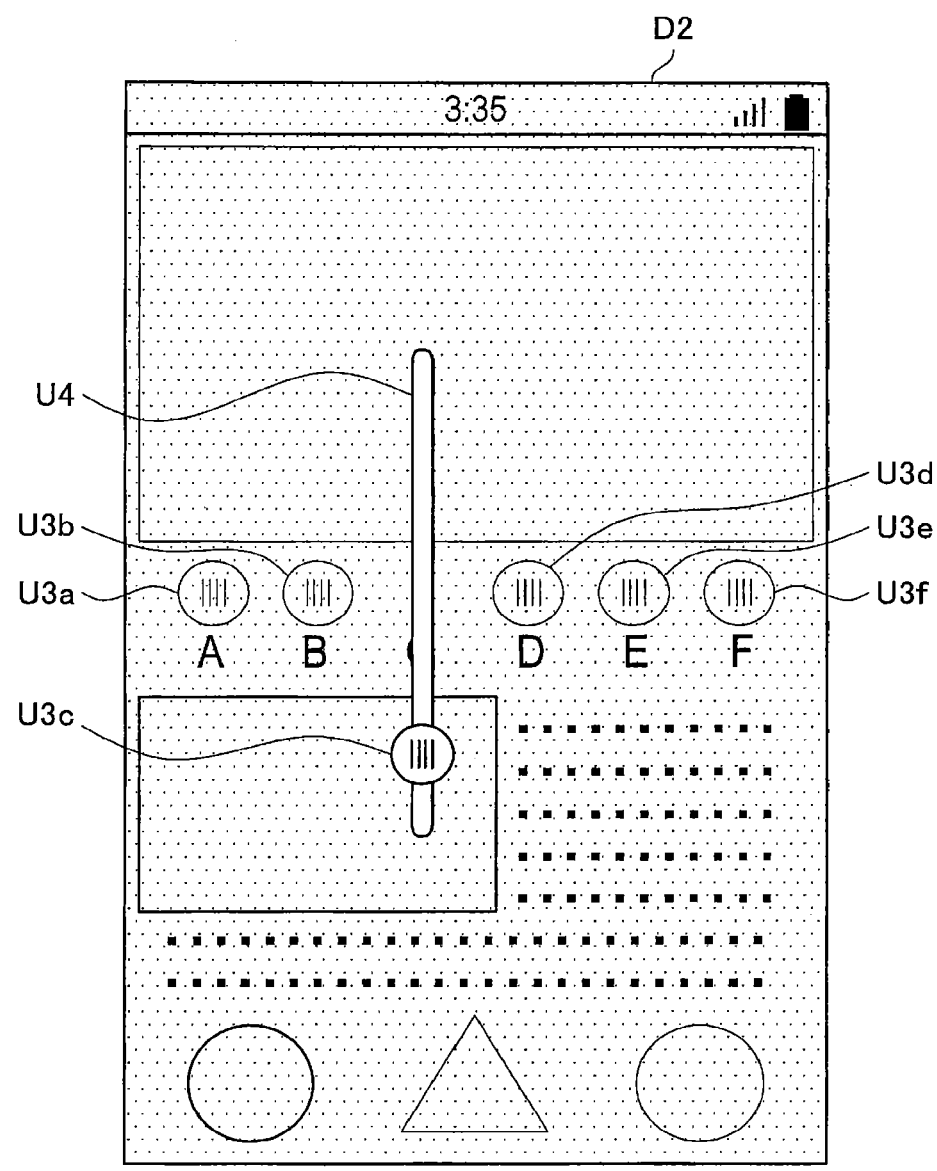
FIG. 18 is a diagram for explaining an exemplary screen display on the display unit 140 of the display device 100.

FIG. 18 is a diagram for explaining an exemplary screen display on the display unit 140 of the display device 100. The display screen D2 shown in FIG. 18 displays the buttons U3a to U3f and the operable range U4 of the button U3c, and displays a state where the user moves the button U3c to the lower side of the operable range U4. In this example, an item to be set by the user using the button U3c is assumed to be specified as an absolute value.

If the user removes the finger from the button U3c in the state shown in FIG. 18, as described above, the display device 100 causes the button U3c to be displayed in such a way as to be moved back to its original position. If the button U3c is moved back to its original position and then the user's finger is again brought into contact with the button U3c, the display device 100 causes the operable range U4 to be displayed on the display screen D2 based on the value set by the button U3c in the state shown in FIG. 18.

Figure 19:
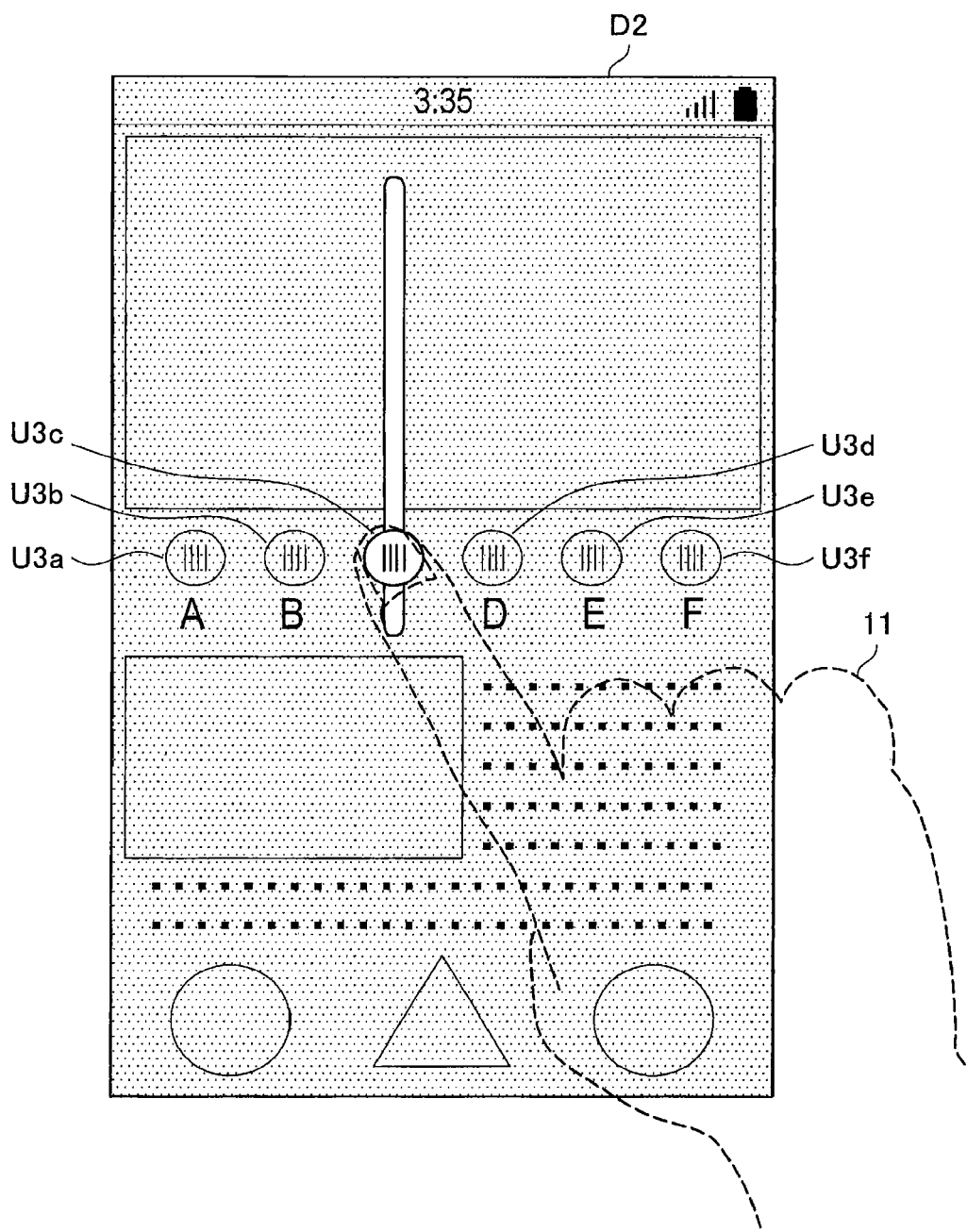
FIG. 19 is a diagram for explaining an exemplary screen display on the display unit 140 of the display device 100.

FIG. 19 is a diagram for explaining an exemplary screen display on the display unit 140 of the display device 100. FIG. 19 illustrates an example of the display screen D2 in a case where the user's finger is brought into contact with the button U3c, when a value is set by the button U3c in the state shown in FIG. 18 and then the display screen is returned to the state shown in FIG. 9. FIG. 19 also illustrates a hand 11 of the user on the display device 100.

When the user's finger is brought into contact with the button U3c, the display device 100 causes the operable range U4 to be displayed on the display screen D2 based on the value set by the button U3c in the state shown in FIG. 18, as shown in FIG. 19. In other words, the display device 100 can cause the operable range U4 to be displayed on the display screen D2 while maintaining a positional relationship between the button U3c and the operable range U4 as shown in FIG. 18, rather than causing the operable range U4 to be displayed on the display screen D1 with the button U3c as a center.

In this way, even when the operable range U4 is one-dimensional, the operable range U4 is displayed based on the value set by the button U3c, and thus the display device 100 allows a current setting value to be displayed for the user to easily recognize the current setting value.

The display device 100 can change the operable range defined by the operation portion displayed when the user is in contact with the operation portion in accordance with the position of the operation portion on the display screen.

Figure 20:
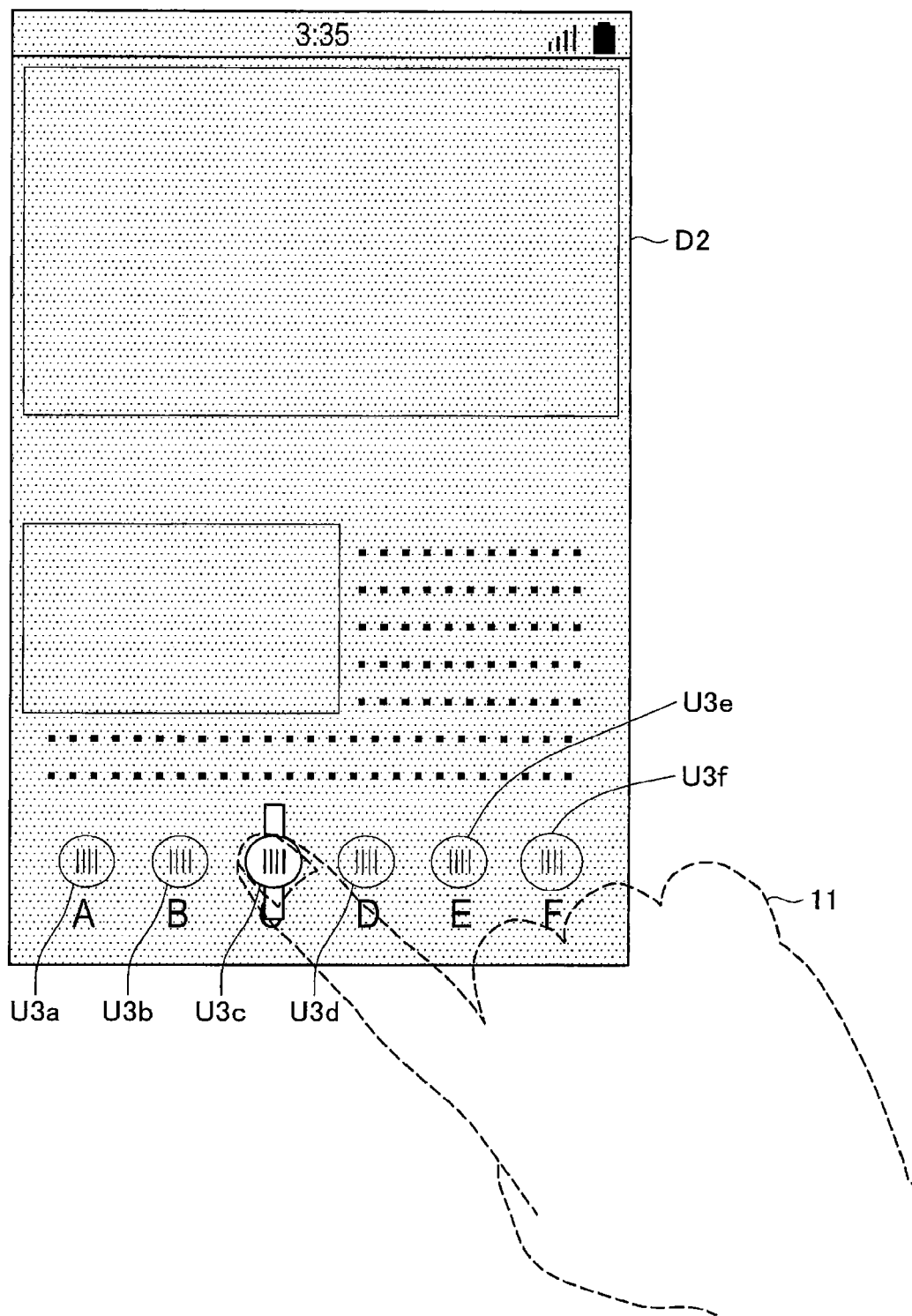
FIG. 20 is a diagram for explaining an exemplary screen display on the display unit 140 of the display device 100.

FIG. 20 is a diagram for explaining an exemplary screen display on the display unit 140 of the display device 100. In FIG. 20, the buttons U3a to U3f and the operable range U4 of the button U3c are displayed on the display screen D2. When the buttons U3a to U3f are displayed at a position near the lower end of the display unit 140 as shown in FIG. 20, the controller 130 may cause the operable range U4 having a shorter length to be displayed on the display screen D2.

In the example described above, when the finger or the like of the user is brought into contact with the operation portion, regions other than the operable range defined by the operation portion are darkened. However, the present disclosure is not limited to this example.

As an example, if the operation portion is used to change the brightness of an image, the controller 130 may cause regions other than both the operable range and the image to be darkened. If the operation portion is used to change the brightness of an image, the controller 130 causes regions other than both the operable range and the image to be darkened, and thus the user can change the setting of brightness of the image while viewing the state of brightness of the image.

Figure 21:
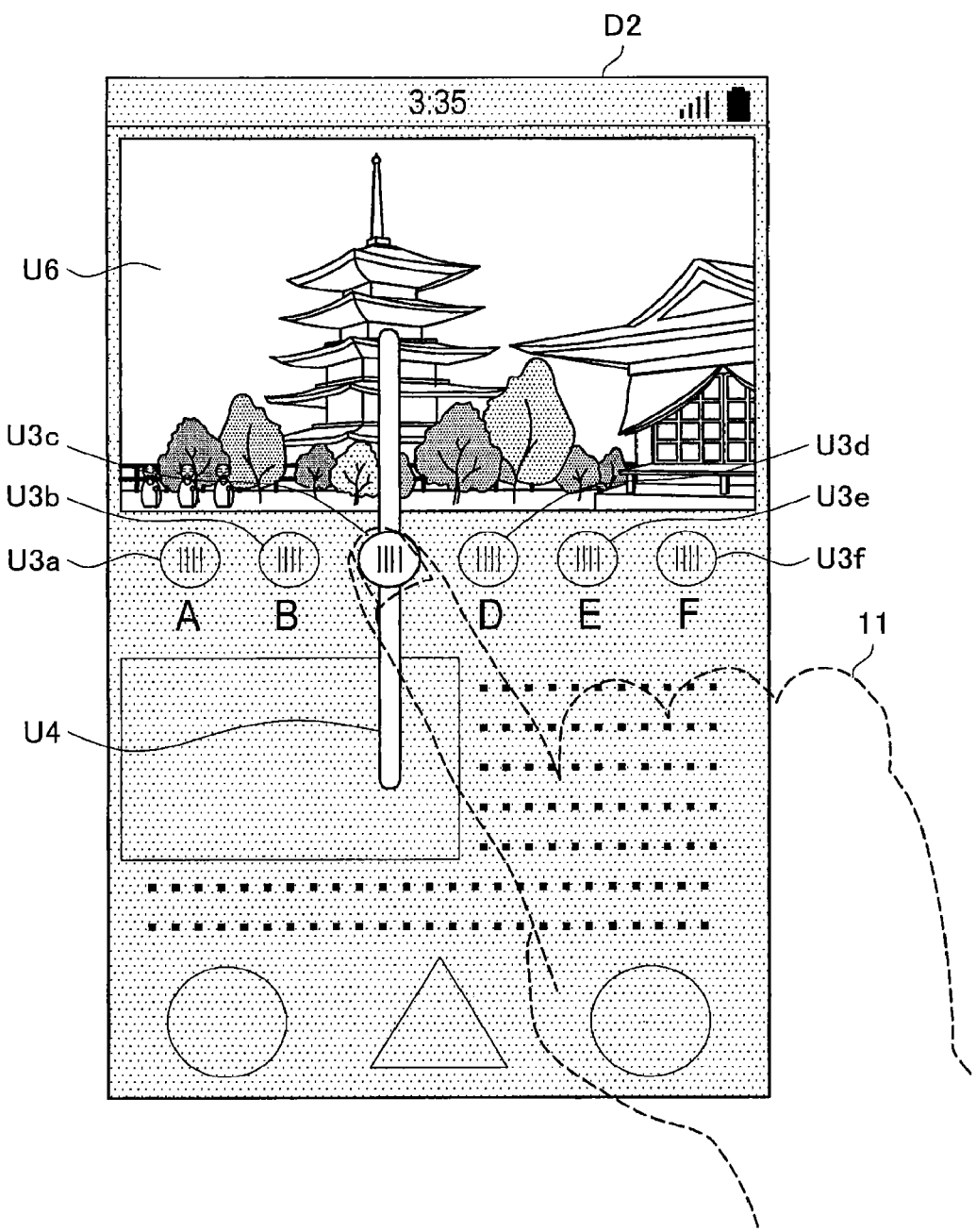
FIG. 21 is a diagram for explaining an exemplary screen display on the display unit 140 of the display device 100.

FIG. 21 is a diagram for explaining an exemplary screen display on the display unit 140 of the display device 100. In FIG. 21, the buttons U3a to U3f and the operable range U4 of the button U3c are displayed on the display screen D2. In addition, the display screen D2 shown in FIG. 21 also displays image data U6.

The button U3c displayed on the display screen D2 shown in FIG. 21 is assumed to be an operation portion used to change the brightness of the image data U6. In this case, when the finger or the like of the user is brought into contact with the button U3c, the controller 130 causes regions other than both the operable range U4 and the image data U6 to be darkened. When the user performs an operation for dragging the button U3c along the operable range U4 in a state where the finger or the like of the user is brought into contact with the button U3c, the controller 130 can change the brightness of the image data U6 in accordance with the user's operation.

In this way, when the operation portion is used to change the brightness of an image, the controller 130 causes ranges other than both the operable range of the operation portion and the image to be darkened, and thus display device 100 allows the user to easily recognize contents of the setting.

If the operation detection unit 120 does not detect that the user's finger is brought into contact with the touch panel, the controller 130 may cause the display unit 140 to display an operation portion and an operable range of the operation portion in a state where their size is reduced.

Figure 22:
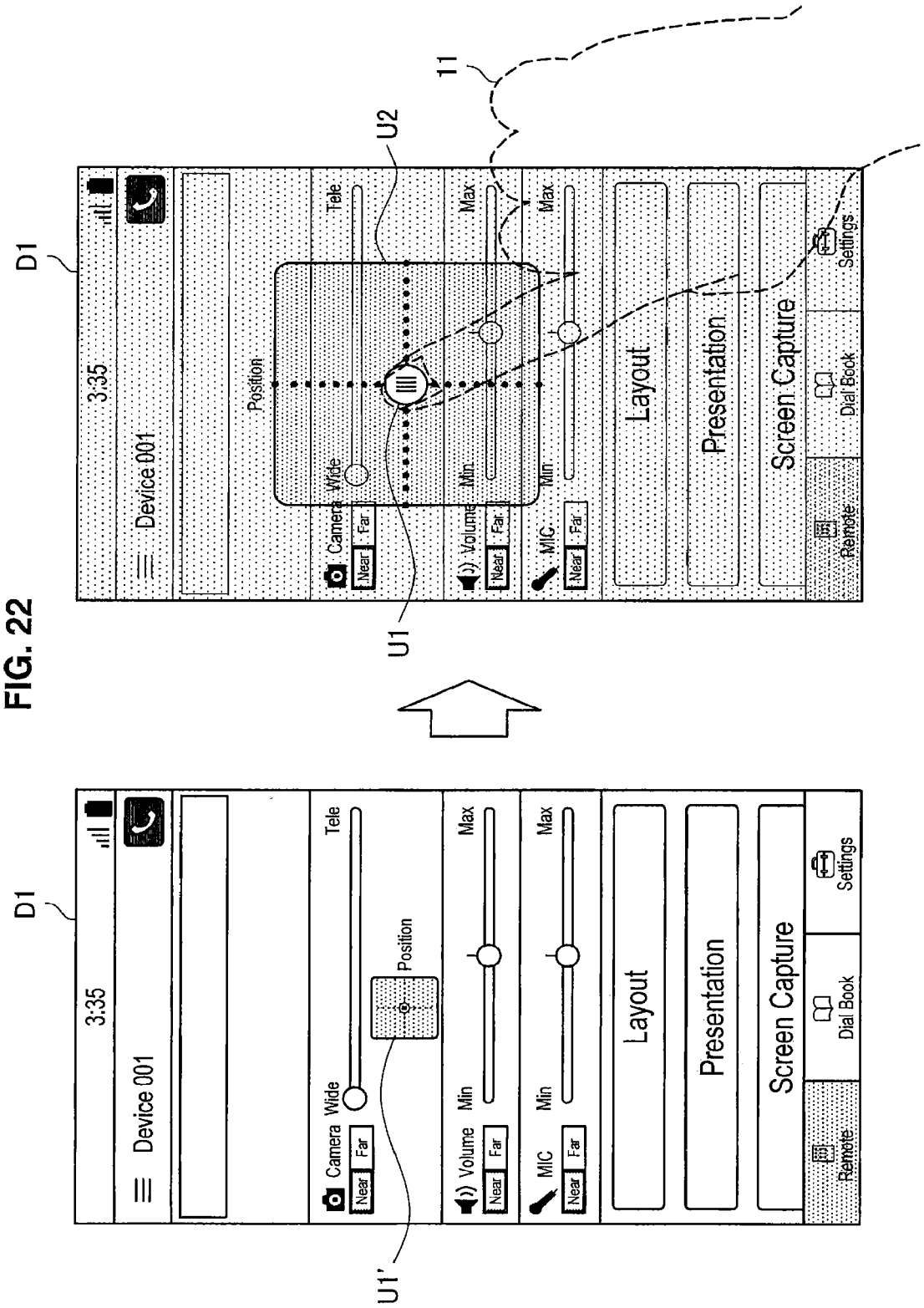
FIG. 22 is a diagram for explaining an exemplary screen display on the display unit 140 of the display device 100.

FIG. 22 is a diagram for explaining an exemplary screen display on the display unit 140 of the display device 100. The display screen D1 is an example of a screen to be displayed on the display unit 140. FIG. 22 illustrates how an operation portion U1' is displayed on the display screen D1. The operation portion U1' is obtained by reducing the handle U1 that is an example of an operation portion and the operable range U2 of the handle U1.

If the operation detection unit 120 detects an event that the user' finger is brought into contact with a location at which the operation portion U1' is displayed, the controller 130 causes the display unit 140 to display the operation portion U1' with enlarged size. In other words, as shown on the right side of FIG. 22, if the operation detection unit 120 detects that the user' finger is brought into contact with the location at which the operation portion U1' is displayed, the controller 130 causes the display unit 140 to display the handle U1 and the operable range U2 of the handle U1 obtained by enlarging the operation portion U1'.

In this way, the display device 100 can present a current setting value to the user even prior to being contacted with the operation portion U1' by reducing and displaying the handle U1 and the operable range U2 of the handle U1.

Figure 23:
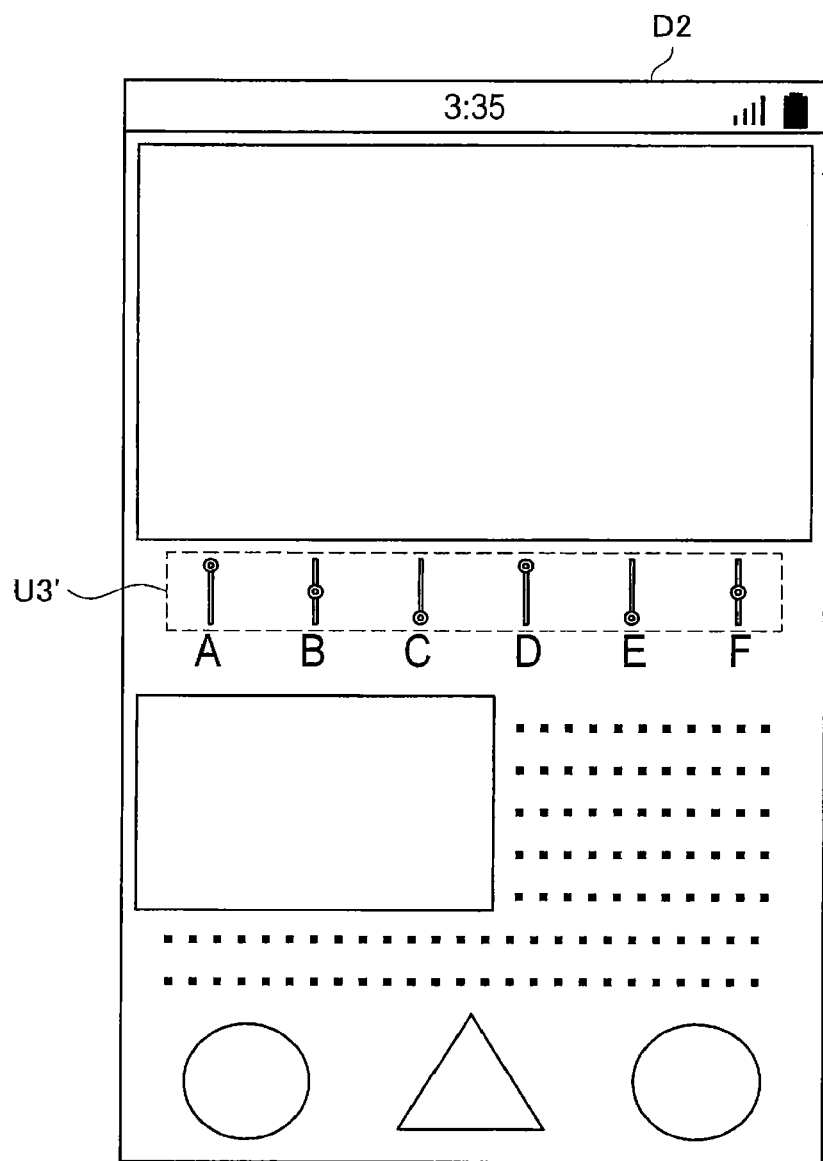
FIG. 23 is a diagram for explaining an exemplary screen display on the display unit 140 of the display device 100.

Even when the operable range of the operation portion is one-dimensional, the controller 130 may cause the display unit to display the operation portion and the operable range of the operation portion in a state where their size is reduced. FIG. 23 is a diagram for explaining an exemplary screen display on the display unit 140 of the display device 100. The display screen D2 is an example of a screen to be displayed on the display unit 140. FIG. 23 illustrates how an operation portion U3' is displayed on the display screen D2. The operation portion U3' is obtained by reducing buttons that are an example of an operation portion and an operable range of each button.

When the operation detection unit 120 detects an event that the user's finger is brought into contact with a location at which the operation portion U3' is displayed, the controller 130 can cause a button with which the user is in contact and an operable range defined by the button to be enlarged in the operation portion U3' and to be displayed on the display unit 140.

If the operation detection unit 120 can detect proximity of the user's finger or the like to a touch panel in addition to contact of the user's finger or the like with a touch panel, the controller 130 may change the display state of an operation portion or an operable range in both cases of detecting proximity and contact of the finger or the like.

Figure 24:
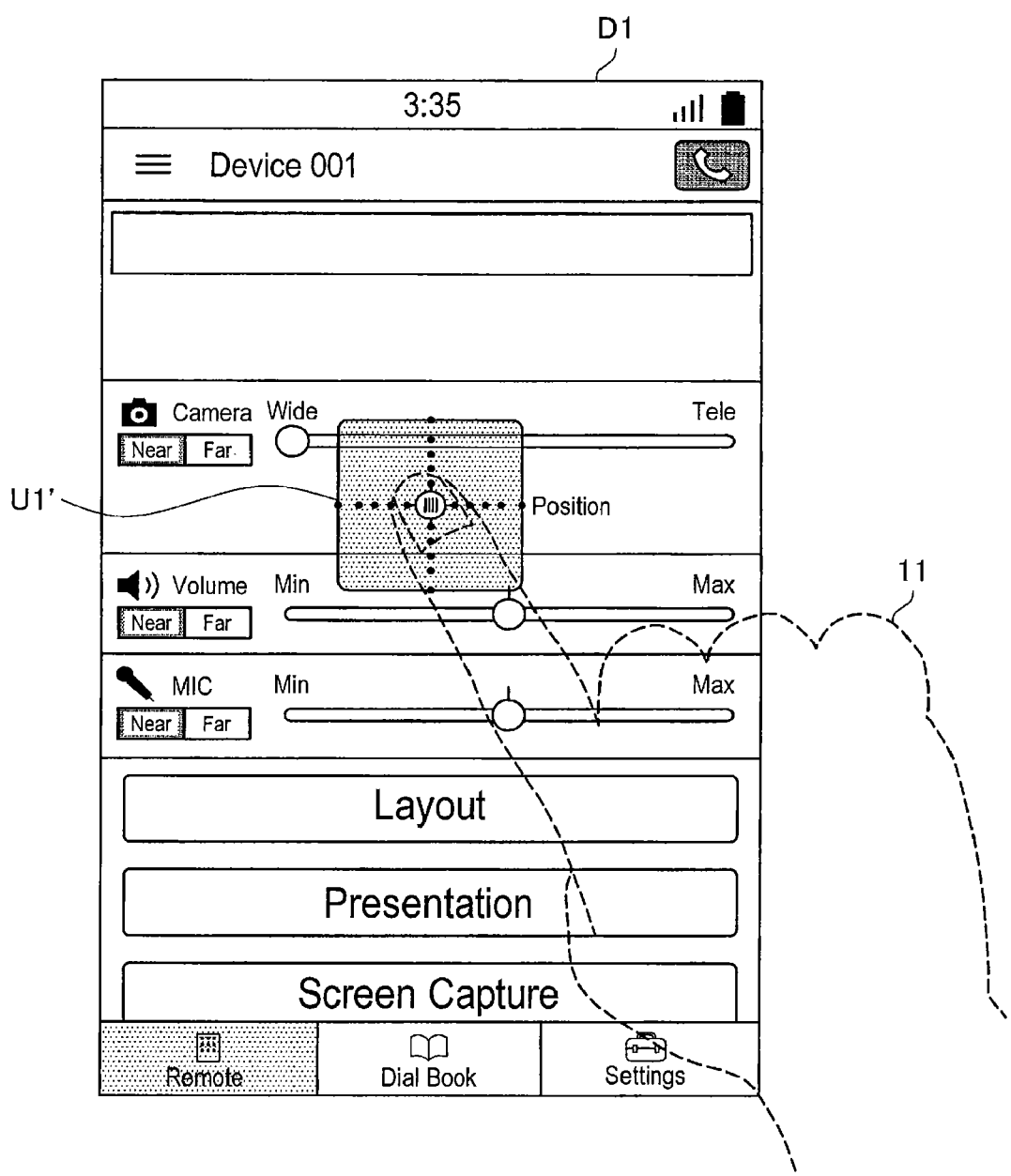
FIG. 24 is a diagram for explaining an exemplary screen display on the display unit 140 of the display device 100.

FIG. 24 is a diagram for explaining an exemplary screen display on the display unit 140 of the display device 100. The display screen D1 is an example of a screen to be displayed on the display unit 140. FIG. 24 illustrates an example of displaying a state where the finger or the like of the user is in proximity to the operation portion U1' when the display screen D1 is displayed as shown on the left side of FIG. 22. If the operation detection unit 120 detects that the finger or the like of the user is in proximity to the operation portion U1', as shown in FIG. 24, the controller 130 causes the operation portion U1' to be enlarged and displayed.

In this way, in both cases of detecting the proximity and the contact of the finger or the like, the controller 130 changes the display state of the operation portion U1'. Accordingly, the display device 100 can present the fact that the operation portion U1' is enlarged when the finger or the like of the user is brought into contact with the operation portion U1' to the user.

If a screen to be displayed on the display device 100 is used to allow the user to control other device, an operation portion and an operable range are displayed on the other device, thus the display device 100 allows the user to control the other device while viewing the other device without viewing the display device 100.

Figure 25:
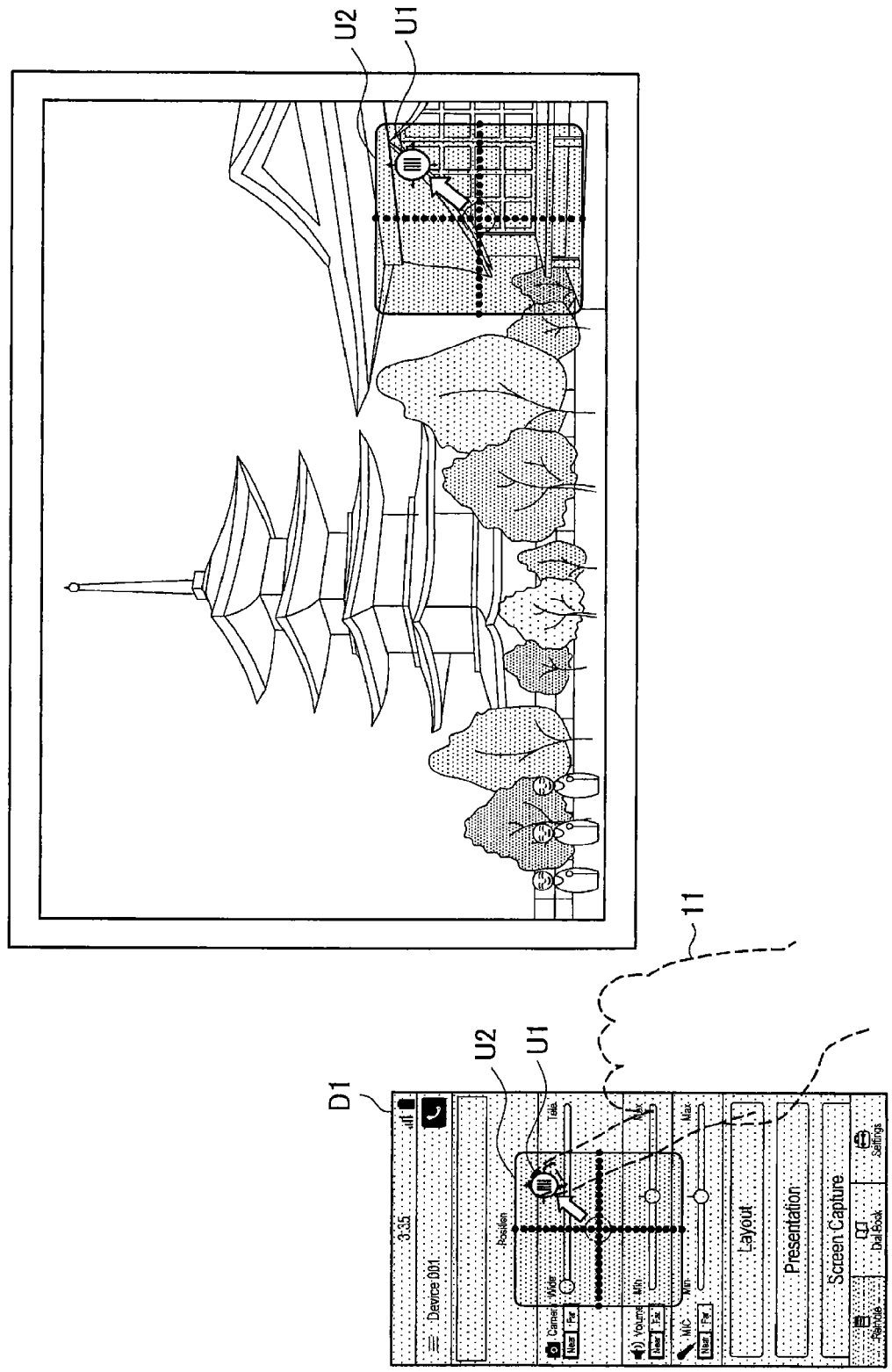
FIG. 25 is a diagram for explaining an exemplary screen display on the display unit 140 of the display device 100.

FIG. 25 is a diagram for explaining an exemplary screen display on the display unit 140 of the display device 100 and an exemplary screen display on a device controlled by the display device 100. FIG. 25 illustrates an exemplary display screen in a case where an image captured by a camera is displayed on a device controlled by the display device 100.

As an example, when the operation portion U1 and the operable range U2 of the operation portion U1 are displayed on the display unit 140 of the display device 100 by the contact of the finger or the like of the user with a touch panel, the operation portion U1 and the operable range U2 of the operation portion U1 can be displayed on a device controlled by the display device 100. In this way, the operation portion U1 and the operable range U2 are displayed on a device controlled by the display device 100, and accordingly, the user can operate the display device 100 while viewing a device controlled by the display device 100 without viewing the display device 100 in the user's hand.

In the example described above, although the case where the user operates the operation unit 110 (touch panel) with any one finger of the user has been illustrated, the present disclosure is not limited thereto. Even when two or more fingers of the user are in contact with the operation unit 110 (touch panel), the display device 100 can perform a similar detection control and display control.

In the case where one finger of the user is brought into contact with the operation unit 110 (touch panel) and the case where two or more fingers of the user are brought into contact with the operation unit (touch panel), the display device 100 may perform different control functions in each case, or may perform the same control in both cases. In addition, in a case where one finger of the user is brought into contact with the operation unit 110 (touch panel) and then the number of fingers in contact with the operation unit 110 (touch panel) is increased, the display device 100 may perform the same or different control functions before and after increasing the number of fingers of the user.

Figure 26:
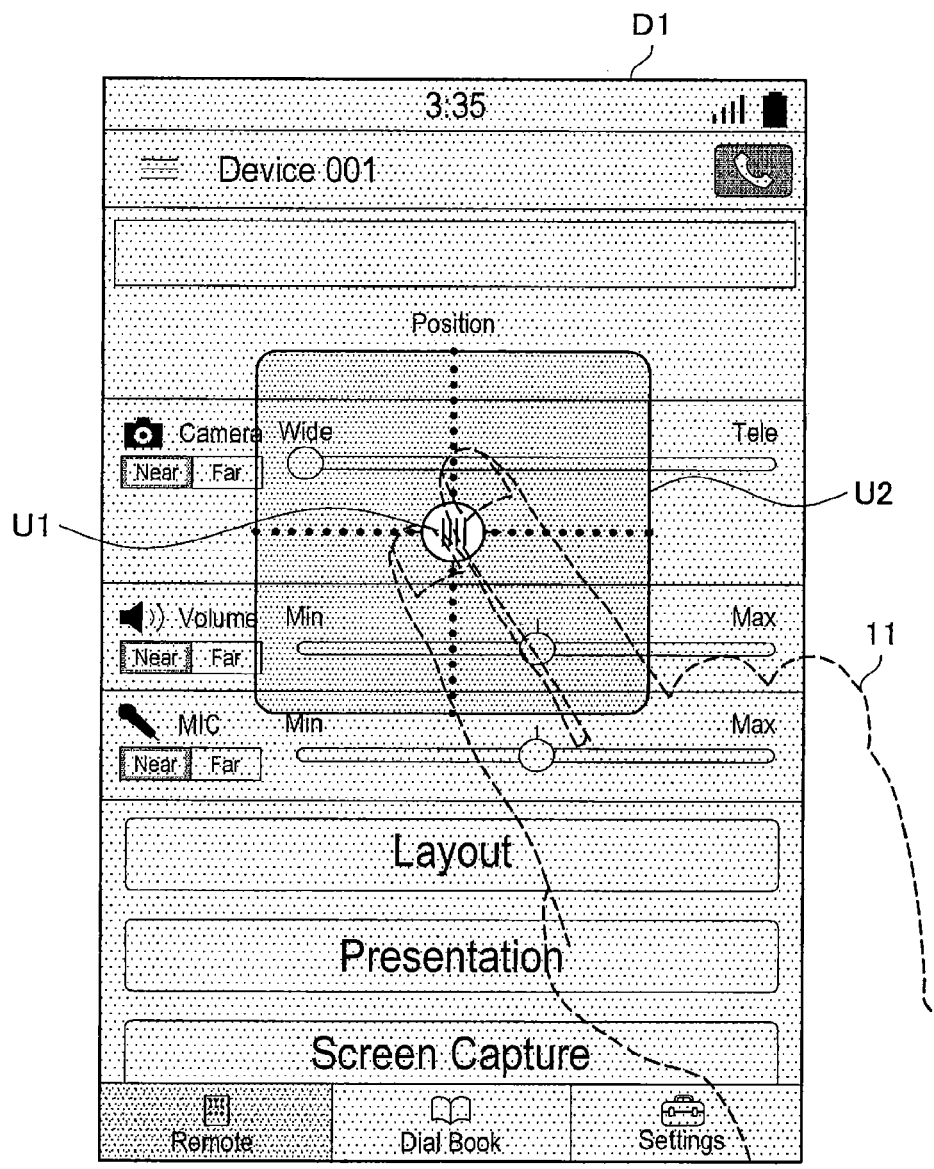
FIG. 26 is a diagram for explaining an exemplary screen display on the display unit 140 of the display device 100.

In the following, an example where two fingers of the user are brought into contact with the operation unit 110 (touch panel) will be described. FIG. 26 is a diagram for explaining an exemplary screen display on the display unit 140 of the display device 100. In FIG. 26, the handle U1 and the operable range U2 of the handle U1 are displayed on the display screen D1. FIG. 26 illustrates how the user performs a pinch operation using two fingers (operation for using the thumb and index finger in a pinching or spreading motion) on the handle U1.

In this way, when the user performs the pinch operation on the handle U1 displayed on the display screen D1 using two fingers, the display device 100 may determine that the user attempts to perform a zoom operation for a camera used in the video conference system. The display device 100 transmits a zoom instruction for a camera used in the video conference system from the communication unit 160 in accordance with the pinch operation on the handle U1 using two fingers.

Figure 27:
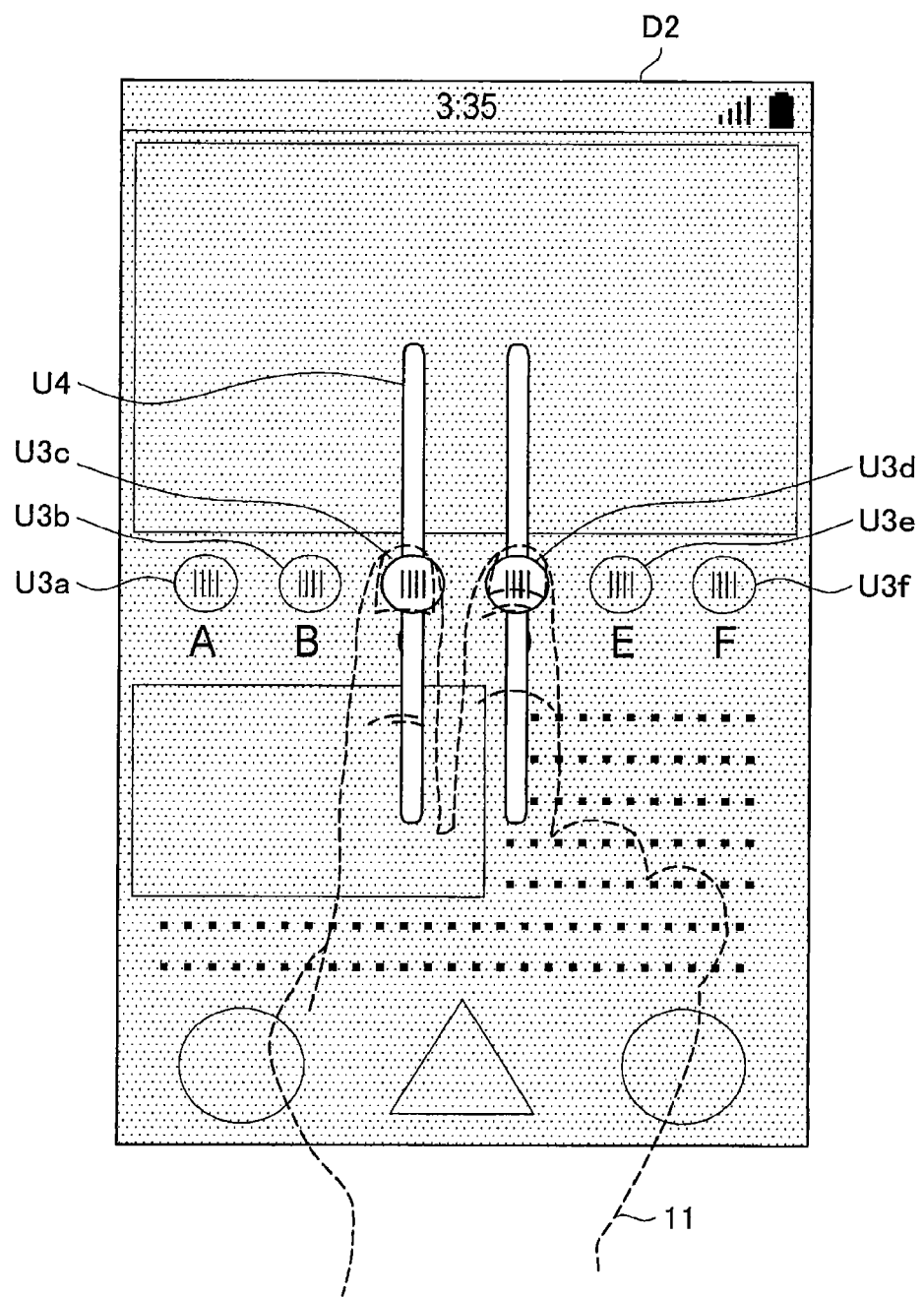
FIG. 27 is a diagram for explaining an exemplary screen display on the display unit 140 of the display device 100.

FIG. 27 is a diagram for explaining an exemplary screen display on the display unit 140 of the display device 100. In FIG. 27, the buttons U3a to U3f that are an example of the operation portion are displayed on the display screen D2. FIG. 27 illustrates how the user attempts to operate the button U3c and the button U3d by using each corresponding finger.

In this way, when the user operates the button U3c and the button U3d displayed on the display screen D2 by using each corresponding finger, the display device 100 controls to receive only the operation on the buttons U3c and U3d while displaying the operable range U4 of the button U3c and the button U3d.

When the user is in contact with the same operation portion with two or more fingers, the display device 100 may perform a control function with the measurement different from the case where only one finger is in contact with the operation portion. As an example, when two or more fingers having the same amount of operation are in contact with the operation portion, the display device 100 may be configured to change the setting value with the half amount of the case where only one finger is in contact with the operation portion.

In the above example, it has been described that, when the user is in contact with an operation portion, the display device 100 causes an operable range of the operation portion to be displayed and performs a control function of disabling the operations other than the operation for the operation portion. However, even when the user performs a touch operation on a location at which an operation portion is displayed and then performs another operation on the locations other than an operable range while holding the touch, the display device 100 according to an embodiment of the present disclosure may receive the another operation as the operation for the operation portion.

As an example, when the operable range U4 of the button U3c is displayed as shown in the display screen D2, in the above example, the display device 100 allows the user to operate the button U3c by moving the finger or the like along the operable range U4 in the state where the finger or the like of the user is in contact with the button U3c. However, the display device 100 may set the entire screen as an operable range as long as the user remains his finger or the like in contact with the button U3c. When the entire screen is set as an operable range, the display device 100 may change the setting value by the movement of the button U3c depending on the distance from the operable range U4.

Figure 28:
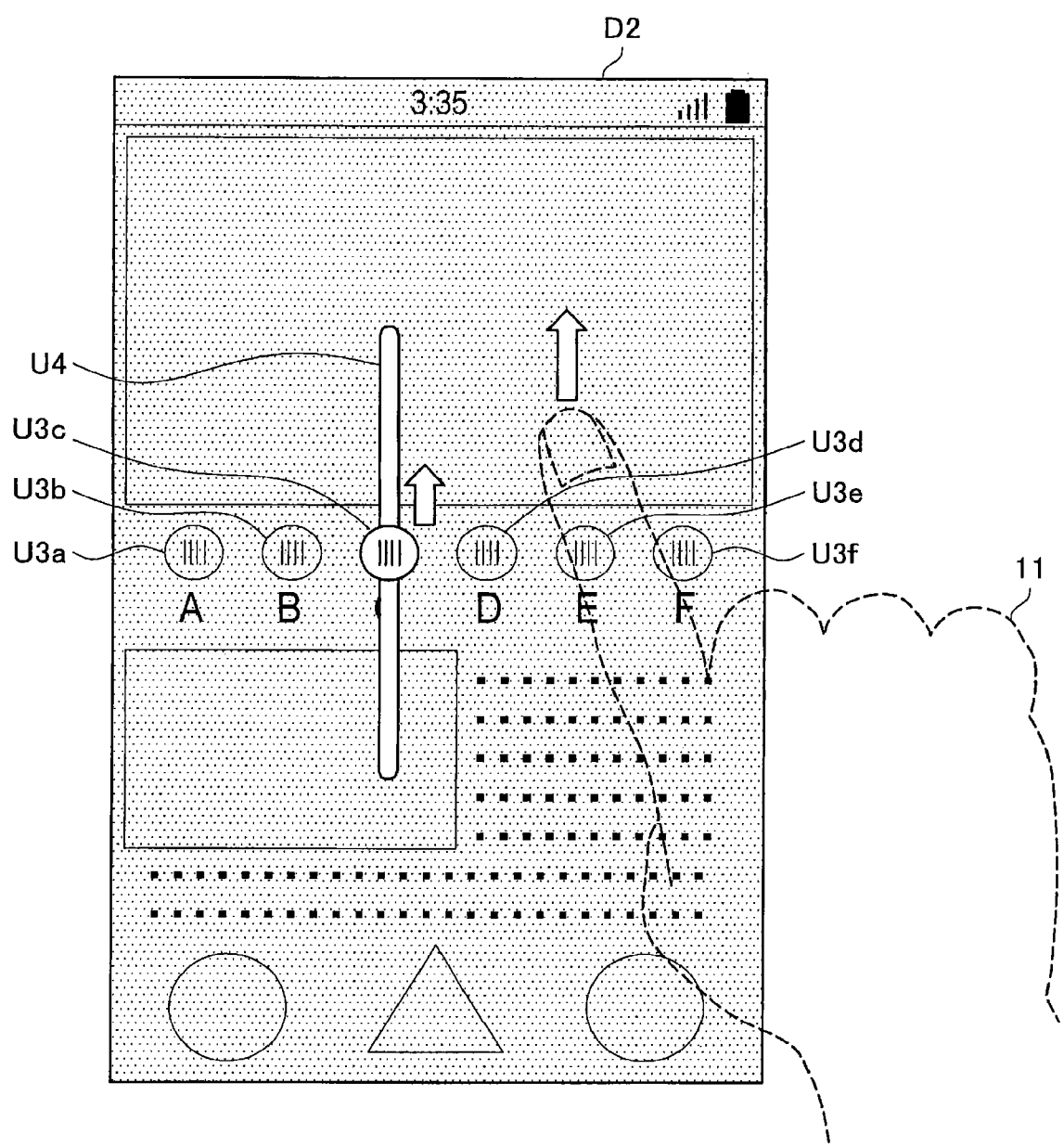
FIG. 28 is a diagram for explaining an exemplary screen display on the display unit 140 of the display device 100.

FIG. 28 is a diagram for explaining an exemplary screen display on the display unit 140 of the display device 100. In FIG. 28, the buttons U3a to U3c that are an example of an operation portion and the operable range U4 of the button U3c are displayed on the display screen D2. FIG. 28 illustrates how the user operates the button U3c using the finger.

FIG. 28 illustrates a state where, after the user places his finger in contact with the button U3, the user moves the finger to the right side of the screen while the user's finger is in contact with the operation portion 110 (touch panel). In this state, if the user moves the finger in the up-down direction, that is, the direction along the operable range U4 of the button U3c, the display device 100 can display the button U3c in such a way as the button U3c is moved in accordance with the movement of the finger.

In this case, the display device 100 allows the amount of movement of the user's finger and the amount of movement of the button U3c to be coincident with each other, but variation in the setting value caused by the movement of the button U3c may be set to be larger or smaller as compared with the case of moving the button U3c in a position at which the operable range U4 is displayed.

As an example, when the user moves the finger to the right side and then moves the finger upward or downward, the display device 100 may set the variation in the setting value caused by the movement of the button U3c to be larger as compared with the case of moving the button U3c in a position at which the operable range U4 is displayed. On the other hand, when the user moves the finger to the left side and then moves the finger upward or downward, the display device 100 may set the variation in the setting value caused by the movement of the button U3c to be smaller as compared with the case of moving the button U3c in a position at which the operable range U4 is displayed. The display device 100 may change the variation in the setting value caused by the movement of the button U3c with a reverse pattern.

2. Hardware Configuration Example

Figure 29:
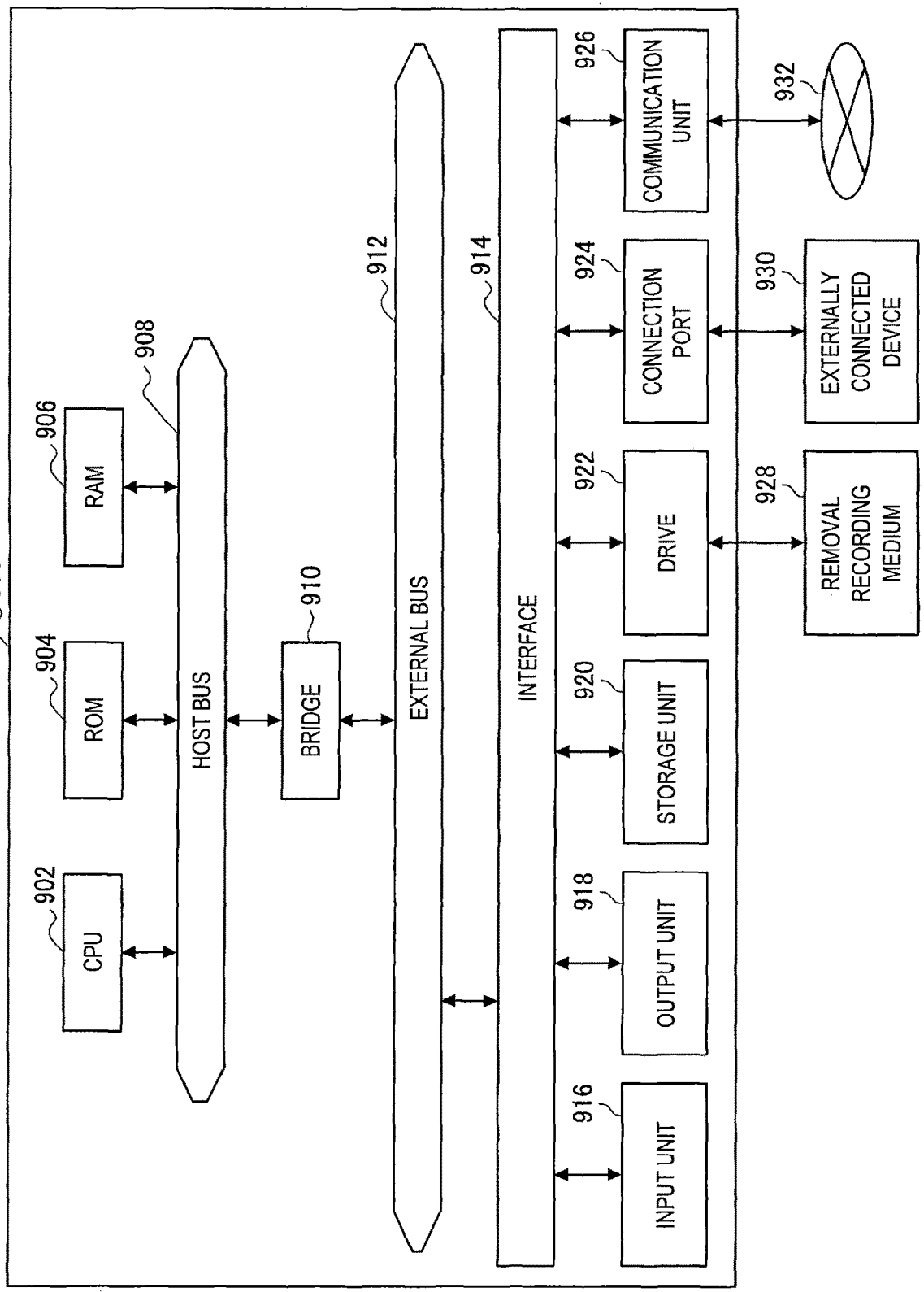
FIG. 29 is a diagram for explaining an exemplary hardware configuration of the display device 100.

The operation of the display control device 200 described above can be performed by using, for example, the hardware configuration of the information processing apparatus shown in FIG. 29. That is, operation of the display device 100 may be realized by controlling the hardware shown in FIG. 29 using a computer program. Additionally, the mode of this hardware is arbitrary, and may be a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As shown in FIG. 29, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

3. Summary

In accordance with an embodiment of the present disclosure described above, the display device 100 that includes the operation detection unit 120 configured to detect contact or proximity of a user to a screen, and a controller 130 configured to perform a display control based on the detection by the operation detection unit 120 is provided. In the display device 100, the operation detection unit 120 enables only a detection in a predetermined range on the screen while detecting contact or proximity to an operation portion displayed on the screen, and the controller 130 explicitly indicates a range corresponding to the predetermined range while the operation detection unit 120 detects contact or proximity to the operation portion.

The display device 100 according to an embodiment of the present disclosure that includes the configuration described above can improve area efficiency in a screen operated by the user. In other words, when the user is not in contact with a screen, the display device 100 causes only an operation portion to be displayed. When the user is in contact with the operation portion or in proximity to the operation portion using the finger, the display device 100 causes an operable range defined by the operation portion to be displayed, thereby increasing area efficiency in the screen operated by the user.

The respective steps in the processing executed by the various apparatuses described in the present disclosure do not have to be performed in chronological order according to the order described as a sequence diagram or flowchart. For example, the respective steps in the processing executed by the various apparatuses can be carried out in a different order to that described in the flowcharts, or can be carried out in parallel.

In addition, a computer program can be created that makes hardware, such as a CPU, ROM, and RAM, in the various apparatuses realize functions equivalent to the parts of the various above-described apparatuses. Still further, a storage medium on which such a computer program is stored can also be provided. Moreover, series of processes can also be realized by hardware by configuring the respective function blocks illustrated in the function block diagrams as hardware.

It should be understood by those skilled in the art that various modifications, combinations, sub-combinations and alterations may occur depending on design requirements and other factors insofar as they are within the scope of the appended claims or the equivalents thereof.

For example, when the finger or the like of the user is brought into contact with the handle U1, the controller 130 causes the display unit 140 to display the operable range U2. In this case, the controller 130 may cause an image captured by a camera used in a video conference system to be displayed on the operable range U2.

Additionally, the present technology may also be configured as below.

(1) A display device comprising: processing circuitry configured to detect contact to or proximity of an object with respect to a generated image, and responsive to detection of contact to or proximity of the object to the generated image, disabling any operational functions associated with a first portion of the generated image.

(2) The display device according to (1), wherein the generated image is displayed on a touch-responsive screen.

(3) The display device according to (1) or (2), wherein the object is a user's finger.

(4) The display device according to any one of (1) to (3), wherein the processing circuitry is configured to allow operation associated with a second portion of the generated image responsive to the detection of contact to or proximity of the object to the generated image, the second portion of the generated image being different from the first portion of the generated image.

(5) The display device according to any one of (1) to (4), wherein the processing circuitry is configured to display on the generated image an indication corresponding to the second portion of the generated image for which operation is enabled.

(6) The display device according to any one of (1) to (5), wherein the second portion is a predetermined range around a contact or proximity point or points associated with the detection of the contact to or proximity of the object with respect to the generated image.

(7) The display device according to any one of (1) to (4), wherein the processing circuitry is configured to display on the generated image an indication in a second portion different from the first portion for which operational functions are disabled responsive to the detection of contact to or proximity of the object to the generated image.

(8) The display device according to any one of (1) to (7), wherein the processing circuitry is configured to detect whether contact to or proximity of the object is released, and enable the operational functions associated with the first portion of the generated image.

(9) The display device according to any one of (1) to (8), wherein the processing circuitry is configured to detect whether contact to or proximity of the object is released, and remove an indication on the generated image indicative of a second portion of the generated image, different from the first portion, representative of an operational area of the generated image.

(10) The display device according to any one of (1) to (9), wherein the processing circuitry is configured to responsive to the detection of contact to or proximity of the object to the generated image, allow operation associated with a second portion of the generated image, the second portion of the generated image being different from the first portion of the generated image and including a predetermined operational portion of the generated image, and enable movement of the predetermined operational portion of the generated image from a first position to a second position within the second portion of the generated image, and responsive to detecting whether contact to or proximity of the object is released, automatically move the predetermined operation portion of the generated image from the second position to the first position, and enable the operational functions associated with the first portion of the generated image.

(11) The display device according to (10), wherein the first position is an initial position of the predetermined operational portion of the generated image.

(12) The display device according to any one of (1) to (11), wherein the processor is configured to display a predetermined operational portion of the generated image at a first size, and one of reduce or enlarge the size of the predetermined operational portion of the generated image from the first size to a second size responsive to the detection of contact to or proximity of the object to the generated image, the detection of contact to or proximity of the object being with respect to the predetermined operational portion of the generated image at the first size.

(13) A display method comprising: detecting, using a processor, contact to or proximity of an object with respect to a generated image, and disabling, using the processor, any operational functions associated with a first portion of the generated image responsive to said detecting contact to or proximity of the object to the generated image.

(14) The display method according to (13), further comprising allowing, using the processor, operation associated with a second portion of the generated image responsive to said detecting contact to or proximity of the object to the generated image, wherein the second portion of the generated image is different from the first portion of the generated image.

(15) The display method according to (13) or (14), further comprising displaying, using the processor, an indication in a second portion, different from the first portion for which operational functions are disabled, responsive to said detecting contact to or proximity of the object to the generated image.

(16) A non-transitory computer-readable storage medium storing computer-readable instructions that, when executed by a computer, cause the computer to perform a method comprising: detecting contact to or proximity of an object with respect to a generated image, and disabling any operational functions associated with a first portion of the generated image responsive to said detecting contact to or proximity of the object to the generated image.

(17) The non-transitory computer-readable storage medium according to (16), further comprising: allowing operation associated with a second portion of the generated image responsive to said detecting contact to or proximity of the object to the generated image, the second portion of the generated image being different from the first portion of the generated image; and displaying an indication in the second portion, which is different from the first portion for which operational functions are disabled, responsive to said detecting contact to or proximity of the object to the generated image.

(18) A graphical user interface comprising: circuitry configured to generate an image; detect contact to or proximity of an object with respect to the generated image, and disable any operational functions associated with a first portion of the generated image responsive to detection of contact to or proximity of the object to the generated image.

(19) The graphical user interface according to (18), wherein the circuitry is configured to display on the generated image an indication corresponding to a second portion of the generated image for which operation is enabled responsive to the detection of contact to or proximity of the object to the generated image, and wherein the second portion of the generated image is different from the first portion of the generated image.

(20) The graphical user interface according to (19), wherein the circuitry is configured to enable the operational functions associated with the first portion of the generated image, and display the generated image responsive to release of contact to or proximity of the object with respect to the generated image.

(21) A display device including:
a detector configured to detect contact or proximity of a user to a screen; and
a display controller configured to perform a display control based on the detection by the detector,
wherein the detector enables only detection in a predetermined range on the screen while detecting contact or proximity to an operation portion displayed on the screen, and
wherein the display controller explicitly indicates a range corresponding to the predetermined range while the detector detects contact or proximity to the operation portion.

(22) The display device according to (21), wherein the display controller causes the range corresponding to the predetermined range and a range other than the range corresponding to the predetermined range to be displayed in distinction from each other while the detector detects contact or proximity to the operation portion.

(23) The display device according to (21) or (22), wherein the display controller reduces the operation portion and causes the reduced operation portion to be displayed on the screen while contact or proximity to the operation portion displayed on the screen is not detected.

(24) The display device according to (23), wherein the display controller, when the detector detects proximity to the operation portion, enlarges the operation portion displayed in reduced size and causes the enlarged operation portion to be displayed on the screen.

(25) The display device according to any one of (21) to (24), wherein, when the detector does not detect contact or proximity to the operation portion, the display controller performs a display control for causing the operation portion to be moved back to a location in a case where contact or proximity to the operation portion displayed on the screen is not detected.

(26) The display device according to any one of (21) to (25), wherein the display controller changes a position of the predetermined range in accordance with a value specified by the operation portion.

(27) A display controlling method including:
detecting contact or proximity of a user to a screen; and
performing a display control based on the detection by the step of detecting,
wherein the step of detecting enables only detection in a predetermined range on the screen while detecting contact or proximity to an operation portion displayed on the screen, and
wherein the step of performing the display control explicitly indicates a range corresponding to the predetermined range while detecting contact or proximity to the operation portion in the step of detecting.

(28) A computer program for causing a computer to execute:
detecting contact or proximity of a user to a screen; and
performing a display control based on the detection by the step of detecting,
wherein the step of detecting enables only detection in a predetermined range on the screen while detecting contact or proximity to an operation portion displayed on the screen, and
wherein the step of performing the display control explicitly indicates a range corresponding to the predetermined range while detecting contact or proximity to the operation portion in the step of detecting.

What is claimed is:
1. A display device comprising:
circuitry configured to
detect a first contact of a first object to a touch screen over a first operational portion of the generated image,
detect a second contact of a second object to the touch screen over a second operational portion of the image generated on the touch screen, the second operation portion being different from the first operational portion;
expressly display on the touch screen a first indicator that identifies a first operational area of the generated image that is operational, in response to the detection of first contact of the first object to the touch screen over the first operational portion of the generated image, the first indicator not being visible prior to the detection of contact of the first object to the touch screen over the first operational portion of the generated image, the first indicator being displayed such that a first area on the touch screen where the first contact of the first object is detected being included within the first operational area indicated by the first indicator, expressly display on the touch screen a second indicator that identifies a second operational area of the generated image that is operational, in response to said detecting the second contact of the second object to the touch screen over the second operational portion of the generated image, the second indicator being different from the first indicator, the second indicator not being visible prior to the detection of contact of the second object to the touch screen over the second operational portion of the generated image, the second indicator being displayed such that a second area on the touch screen where the second contact of the second object is detected being included within the second operational area indicated by the second indicator, responsive to detection of a first operation of the first object to the touch screen over the first operational portion of the generated image, the first operation being a first continuous movement of the first object along the touch screen after the first contact without releasing the first object from the touch screen, set a first value of a first function of a remote apparatus, the first value corresponding to a first movement amount of the first continuous movement, responsive to detection of a second operation of the second object to the touch screen over the second operational portion of the generated image, the second operation being a second continuous movement of the second object along the touch screen after the second contact without releasing the second object from the touch screen, set a second value of a second function of the remote apparatus, the second function being different from the first function, the second value corresponding to a second movement amount of the first continuous movement, detect whether the first contact of the first object to the touch screen over the first operational portion of the generated image is released, detect whether the second contact of the second object to the touch screen over the first operational portion of the generated image is released, stop the expressly displaying of the first operational portion in response to detecting the first contact of the first object to the touch screen over the first operational portion of the generated image being released, and stop the expressly displaying of the second operational portion in response to detecting the second contact of the second object to the touch screen over the second operational portion of the generated image being released, wherein the remote apparatus has a camera, the first operation portion and the second operation portion are superimposed on an image captured by the camera of the remote apparatus, and the first operation portion and the second operation portion are displayed simultaneously in response to detecting the first contact and the second contact simultaneously.

2. The display device according to claim 1, wherein the first object is a user's first finger, and the second object is the user's second finger.

3. The display device according to claim 1, wherein the generated image is comprised of a plurality of graphics.

4. The display device according to claim 1, wherein the first indicator of the first operational area includes a relative change in brightness between the first operational portion of the generated image and the second operational portion of the generated image.

5. The display device according to claim 1, wherein the circuitry is configured to disable detection of contact to the touch screen over the second operational portion of the generated image while the first object contacts the touch screen over the first operational portion of the generated image.

6. The display device according to claim 1, wherein the circuitry is configured to allow operation associated with the first operational portion of the generated image while the first object contacts the touch screen over the first operational portion of the generated image.

7. The display device according to claim 1, wherein the display device is a hand-held portable device.

8. The display device according to claim 1, wherein the display device is part of an information appliance.

9. A display method comprising:

detecting, using circuitry, a first contact of a first object to a touch screen over a first operational portion of an image generated on the touch screen;

detecting, using the circuitry, a second contact of a second object to the touch screen over a second operational portion of the image generated on the touch screen, the second operation portion being different from the first operational portion;

expressly displaying on the touch screen, using the circuitry, a first indicator that identifies a first operational area of the generated image that is operational, in response to said detecting the first contact of the first object to the touch screen over the first operational portion of the generated image, the first indicator not being visible prior to the detection of contact of the first object to the touch screen over the first operational portion of the generated image, the first indicator being displayed such that a first area on the touch screen where the first contact of the first object is detected being included within the first operational area indicated by the first indicator;

expressly displaying on the touch screen, using the circuitry, a second indicator that identifies a second operational area of the generated image that is operational, in response to said detecting the second contact of the second object to the touch screen over the second operational portion of the generated image, the second indicator being different from the first indicator, the second indicator not being visible prior to the detection of contact of the second object to the touch screen over the second operational portion of the generated image, the second indicator being displayed such that a second area on the touch screen where the second contact of the second object is detected being included within the second operational area indicated by the second indicator;

responsive to detection of a first operation of the first object to the touch screen over the first operational portion of the generated image, the first operation being a first continuous movement of the first object along the touch screen after the first contact without releasing the first object from the touch screen, setting, using the circuitry, a first value of a first function of a remote apparatus, the first value corresponding to a first movement amount of the first continuous movement;

responsive to detection of a second operation of the second object to the touch screen over the second operational portion of the generated image, the second operation being a second continuous movement of the second object along the touch screen after the second contact without releasing the second object from the touch screen, setting, using the circuitry, a second value of a second function of the remote apparatus, the second function being different from the first function, the second value corresponding to a second movement amount of the first continuous movement;

detecting, using the circuitry, whether the first contact of the first object to the touch screen over the first operational portion of the generated image is released;

detecting, using the circuitry, whether the second contact of the second object to the touch screen over the first operational portion of the generated image is released;

stopping, using the circuitry, the expressly displaying of the first operational portion in response to detecting the first contact of the first object to the touch screen over the first operational portion of the generated image being released; and stopping, using the circuitry, the expressly displaying of the second operational portion in response to detecting the second contact of the second object to the touch screen over the second operational portion of the generated image being released, wherein the remote apparatus has a camera, the first operation portion and the second operation portion are superimposed on an image captured by the camera of the remote apparatus, and the first operation portion and the second operation portion are displayed simultaneously in response to detecting the first contact and the second contact simultaneously.

10. The display method according to claim 9, wherein the first indicator of the first operational area includes a relative change in brightness between the first operational portion of the generated image and the second operational portion of the generated image.

11. The display method according to claim 9, further comprising disabling, using the circuitry, detection of contact to the touch screen over the second operational portion of the generated image while the first object contacts the touch screen over the first operational portion of the generated image.

12. The display method according to claim 9, further comprising allowing, using the circuitry, operation associated with the first operational portion of the generated image while the first object contacts the touch screen over the first operational portion of the generated image.

13. The display method according to claim 9, wherein the first operation portion has two axes to set at least two parameters of the first function of the remote apparatus.

14. A non-transitory computer-readable storage medium storing computer-readable instructions that, when executed by a computer, cause the computer to perform a method comprising:

detecting a first contact of a first object to a touch screen over a first operational portion of an image generated on the touch screen;

detecting a second contact of a second object to the touch screen over a second operational portion of the image generated on the touch screen, the second operation portion being different from the first operational portion;

expressly displaying on the touch screen a first indicator that identifies a first operational area of the generated image that is operational, in response to said detecting the first contact of the first object to the touch screen over the first operational portion of the generated image, the first indicator not being visible prior to the detection of contact of the first object to the touch screen over the first operational portion of the generated image, the first indicator being displayed such that a first area on the touch screen where the first contact of the first object is detected being included within the first operational area indicated by the first indicator;

expressly displaying on the touch screen a second indicator that identifies a second operational area of the generated image that is operational, in response to said detecting the second contact of the second object to the touch screen over the second operational portion of the generated image, the second indicator being different from the first indicator, the second indicator not being visible prior to the detection of contact of the second object to the touch screen over the second operational portion of the generated image, the second indicator being displayed such that a second area on the touch screen where the second contact of the second object is detected being included within the second operational area indicated by the second indicator;

responsive to detection of a first operation of the first object to the touch screen over the first operational portion of the generated image, the first operation being a first continuous movement of the first object along the touch screen after the first contact without releasing the first object from the touch screen, setting a first value of a first function of a remote apparatus, the first value corresponding to a first movement amount of the first continuous movement;

responsive to detection of a second operation of the second object to the touch screen over the second operational portion of the generated image, the second operation being a second continuous movement of the second object along the touch screen after the second contact without releasing the second object from the touch screen, setting a second value of a second function of the remote apparatus, the second function being different from the first function, the second value corresponding to a second movement amount of the first continuous movement;

detecting whether the first contact of the first object to the touch screen over the first operational portion of the generated image is released;

detecting whether the second contact of the second object to the touch screen over the first operational portion of the generated image is released;

stopping the expressly displaying of the first operational portion in response to detecting the first contact of the first object to the touch screen over the first operational portion of the generated image being released; and stopping the expressly displaying of the second operational portion in response to detecting the second contact of the second object to the touch screen over the second operational portion of the generated image being released, wherein the remote apparatus has a camera, the first operation portion and the second operation portion are superimposed on an image captured by the camera of the remote apparatus, and the first operation portion and the second operation portion are displayed simultaneously in response to detecting the first contact and the second contact simultaneously.

15. The method according to claim 14, wherein the first indicator of the first operational area includes a relative change in brightness between the first operational portion of the generated image and the second operational portion of the generated image.

16. The method according to claim 14, further comprising disabling detection of contact to the touch screen over the second operational portion of the generated image while the first object contacts the touch screen over the first operational portion of the generated image.

17. The method according to claim 14, further comprising allowing operation associated with the first operational portion of the generated image while the first object contacts the touch screen over the first operational portion of the generated image.

* * * * *